US012227018B2

(12) United States Patent
Shibata et al.

(10) Patent No.: US 12,227,018 B2
(45) Date of Patent: Feb. 18, 2025

(54) DYE-DEPOSITED BASE BODY MANUFACTURING APPARATUS AND DYEING SYSTEM

(71) Applicant: NIDEK CO., LTD., Aichi (JP)

(72) Inventors: Ryoji Shibata, Aichi (JP); Minoru Inuzuka, Aichi (JP); Koji Abe, Aichi (JP); Motoshi Tanaka, Aichi (JP)

(73) Assignee: NIDEK CO., LTD., Aichi (JP)

( * ) Notice: Subject to any disclaimer, the term of this patent is extended or adjusted under 35 U.S.C. 154(b) by 519 days.

(21) Appl. No.: 17/534,901

(22) Filed: Nov. 24, 2021

(65) Prior Publication Data

US 2022/0161587 A1   May 26, 2022

(30) Foreign Application Priority Data

Nov. 25, 2020   (JP) .................. 2020-195583
Nov. 25, 2020   (JP) .................. 2020-195584
Nov. 25, 2020   (JP) .................. 2020-195585

(51) Int. Cl.
*B41M 5/03*      (2006.01)
*B29D 11/00*     (2006.01)
(Continued)

(52) U.S. Cl.
CPC ..... *B41M 5/0356* (2013.01); *B29D 11/00923* (2013.01); *B29D 11/00259* (2013.01);
(Continued)

(58) Field of Classification Search
CPC ........... B41M 5/0356; B29D 11/00259; B29D 11/00923; B41J 2/17503; B41J 2/17566;
(Continued)

(56) References Cited

U.S. PATENT DOCUMENTS

2001/0018114 A1   8/2001   Inuzuka
2008/0078037 A1   4/2008   Inuzuka et al.
(Continued)

FOREIGN PATENT DOCUMENTS

CN   109342373 A   2/2019
CN   209954133 U   1/2020
(Continued)

OTHER PUBLICATIONS

Search Report issued Apr. 26, 2022 by the European Patent Office in counterpart European Patent Application No. 21210135.6.
(Continued)

*Primary Examiner* — Yaovi M Ameh
(74) *Attorney, Agent, or Firm* — Sughrue Mion, PLLC

(57) ABSTRACT

A dye-deposited base body manufacturing apparatus manufactures a dye-deposited base body. The dye-deposited base body is used in a dyeing step of dyeing a resin body. A dye to be transferred to the resin body is deposited to a base body. The dye-deposited base body manufacturing apparatus is provided with a printing device, a conveyance device, and a base body movement device. The printing device prints a dye for dyeing the resin body on the base body. The conveyance device conveys a dyeing tray on which the dye-deposited resin body on which the dye is printed by the printing device is placed. The base body movement device moves the dye-deposited base body from a printing position by the printing device to a side of the conveyance device.

7 Claims, 12 Drawing Sheets

(51) Int. Cl.
  *B41M 5/035* (2006.01)
  *B41J 3/407* (2006.01)
  *B41J 11/00* (2006.01)
  *B41J 13/00* (2006.01)
(52) U.S. Cl.
  CPC .......... *B41J 3/4073* (2013.01); *B41J 3/40731* (2020.08); *B41J 11/0085* (2013.01); *B41J 13/0009* (2013.01)
(58) Field of Classification Search
  CPC .. B41J 11/0085; B41J 13/0009; B41J 3/4073; B41J 2/21; B41J 3/40731
  See application file for complete search history.

(56) References Cited

U.S. PATENT DOCUMENTS

| | | | | |
|---|---|---|---|---|
| 2009/0141070 | A1* | 6/2009 | Yamamoto | B41J 2/16585 347/22 |
| 2018/0119340 | A1* | 5/2018 | Inuzuka | B29D 11/00923 |
| 2019/0093282 | A1 | 3/2019 | Inuzuka | |
| 2020/0031974 | A1 | 1/2020 | Abell et al. | |
| 2020/0319374 | A1 | 10/2020 | Kim et al. | |

FOREIGN PATENT DOCUMENTS

| | | | | |
|---|---|---|---|---|
| EP | 1 905 890 | B1 | 12/2017 | |
| EP | 3263345 | A1 | 1/2018 | |
| EP | 3 315 661 | A1 | 5/2018 | |
| JP | H11152689 | A * | 6/1999 | ............... D06P 3/00 |
| JP | 2001-159746 | A | 6/2001 | |
| JP | 2001-214386 | A | 8/2001 | |
| JP | 2003-40227 | A | 2/2003 | |
| JP | 2004-52160 | A | 2/2004 | |
| JP | 2005-25130 | A | 1/2005 | |
| JP | 2012215652 | A * | 11/2012 | ............... G02C 7/10 |
| JP | 2014-133957 | A | 7/2014 | |
| JP | 2015-13375 | A | 1/2015 | |
| JP | 2018-1443 | A | 1/2018 | |
| JP | 2018-127722 | A | 8/2018 | |
| JP | 2019-58891 | A | 4/2019 | |
| TW | M361713 | U | 7/2009 | |
| WO | 2016/024552 | A1 | 2/2016 | |

OTHER PUBLICATIONS

Communication dated Aug. 20, 2024, issued by the Japanese Patent Office in Japanese Application No. 2020-195583.
Communication dated Aug. 20, 2024, issued by the Japanese Patent Office in Japanese Application No. 2020-195584.
Communication dated Oct. 1, 2024, issued by the Japanese Patent Office in Japanese Application No. 2020-195585.
Communication dated Dec. 5, 2024 issued by Chinese Patent Office in Application No. 202111403249.3.

* cited by examiner

DYE-DEPOSITED BASE BODY MANUFACTURING APPARATUS AND DYEING SYSTEM

CROSS-REFERENCE TO RELATED APPLICATION

This application claims priority from Japanese Patent Applications No. 2020-195583, No. 2020-195584 and No. 2020-195585 filed on Nov. 25, 2020, the entire subject-matters of which are incorporated herein by reference.

TECHNICAL FIELD

The present disclosure relates to a dye-deposited base body manufacturing apparatus that manufactures a dye-deposited base body used in a dyeing step, and a dyeing system including the dye-deposited base body manufacturing apparatus.

BACKGROUND

Various techniques for dyeing a resin body such as a plastic lens have been proposed. For example, in a dyeing method called an immersion dyeing method, a resin body is dyed by immersing the resin body in a dyeing solution. However, in the immersion dyeing method, it is difficult to improve the working environment and to dye a part of the resin body (for example, lens having a high refractive index).

Therefore, a technique has been proposed in which a dye is transferred to a surface of a resin body and the resin body to which the dye is deposited is heated to dye the resin body. For example, in the dyeing method described in JP-A-2018-127722, an ink containing a sublimable dye is applied (printed) to a base body by a printing device (ink jet printer). Next, the sublimable dye applied to the base body is sublimated in a state where the resin body and the base body are disposed in a vacuum in a non-contact manner, so that the dye is transferred to the resin body. Next, the resin body is scanned with a laser beam to heat the resin body and fix the dye.

In the dyeing method described above in the related art, there were many steps manually performed by an operator when dyeing the resin body. The operator manually aligned a dye-deposited base body with respect to the resin body, and then performed a transfer step. For example, in the dyeing method described in JP-A-2018-127722, the operator was required to manually transport a base body on which the dye was printed by the printing device to a transfer machine. At this time, unless the operator appropriately disposes the dye-deposited base body on which the dye is printed with respect to the resin body, the dyeing quality deteriorates. Therefore, a technique capable of reducing the work required by the operator and dyeing the resin body more efficiently and appropriately is desired.

In addition, an ink containing a dye for dyeing the resin body has properties different from those of the ink used for ordinary printing. For example, in an ink containing a dye, the concentration of the dye in the ink is non-uniform with the passage of time, and as a result, the dyeing quality may deteriorate or defects of the printing device may occur. Therefore, a technique capable of efficiently and appropriately dyeing a resin body according to the properties of an ink containing a dye is desired.

SUMMARY

An object of the present disclosure is to provide a dye-deposited base body manufacturing apparatus and a dyeing system capable of improving efficiency and quality when dyeing a resin body.

A dye-deposited base body manufacturing apparatus including:
  a printing device that prints a dye on a base body;
  a conveyance device that conveys a dyeing tray on which a resin body is placed; and
  a base body movement device that moves a dye-deposited base body on which the dye is printed by the printing device from a printing position by the printing device to a side of the conveyance device,
  in which the dye-deposited base body manufacturing apparatus manufactures the dye-deposited base body to which the dye to be transferred to the resin body is deposited, used in a dyeing step of dyeing the resin body.

A dye-deposited base body manufacturing apparatus including:
  a printing device that prints a dye on a base body; and
  a base body placing device that places a dye-deposited base body on which the dye is printed by the printing device at a predetermined position of a resin body on a dyeing tray in a state where a surface on which the dye is printed by the printing device of the dye-deposited base body faces the resin body placed on the dyeing tray,
  in which the dye-deposited base body manufacturing apparatus manufactures the dye-deposited base body to which the dye to be transferred to the resin body is deposited, used in a dyeing step of dyeing the resin body.

A dye-deposited base body manufacturing apparatus including:
  a printing device that prints ink containing a dye on a base body;
  a cartridge mount unit on which a cartridge containing the ink supplied to the printing device is mounted; and
  an ink stir unit that stirs the ink in the cartridge in a state where the cartridge is mounted on the cartridge mount unit,
  in which the dye-deposited base body manufacturing apparatus manufactures a dye-deposited base body to which the dye to be transferred to a resin body is deposited, used in a dyeing step of dyeing the resin body.

A dyeing system including:
  any one of the above dye-deposited base body manufacturing apparatuses;
  a transfer device that transfers a dye of a dye-deposited base body, to which the dye is deposited, manufactured by the dye-deposited base body manufacturing apparatus to a resin body; and
  a dye fixing device that heats the resin body to which the dye is transferred by the transfer device to fix the dye deposited on a surface of the resin body to the resin body.

According to the dye-deposited base body manufacturing apparatus and the dyeing system according to the present disclosure, the efficiency and quality when dyeing the resin body are appropriately improved.

DETAILED DESCRIPTION

Overview (First Aspect)

Figure 1:
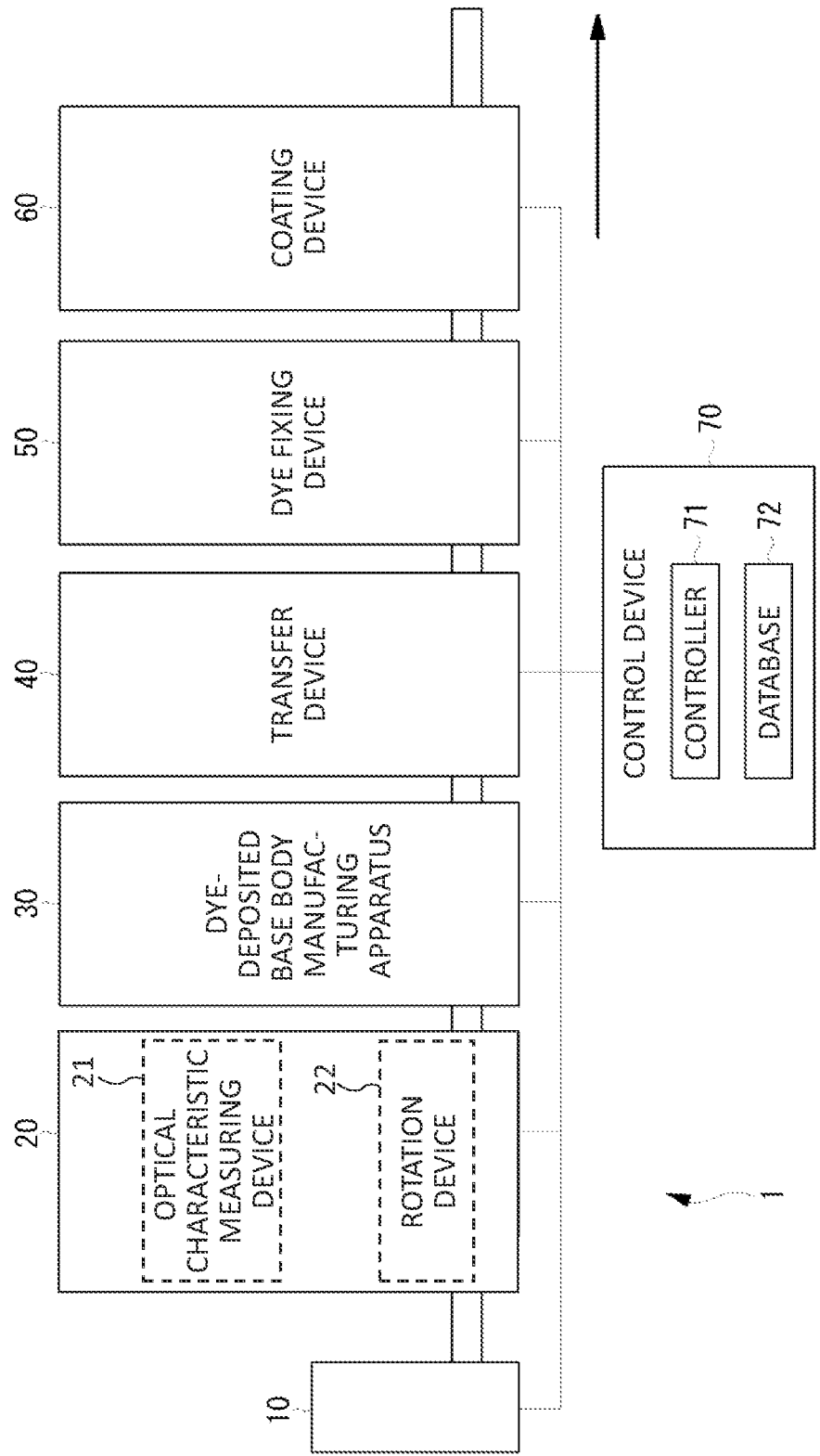
FIG. 1 is a block diagram illustrating a system configuration of a dyeing system 1.

A dye-deposited base body manufacturing apparatus exemplified in the present disclosure manufactures a dye-deposited base body. The dye-deposited base body is used in a dyeing step of dyeing a resin body. A dye to be transferred to the resin body is deposited to a base body to be the dye-deposited base body. The dye-deposited base body manufacturing apparatus is provided with a printing device and a base body placing device. The printing device prints a dye (for example, ink containing a dye) on a base body. The base body placing device places the base body (dye-deposited base body) at a predetermined position on the resin body in a dyeing tray in a state where a surface on which the dye is printed by the printing device of the dye-deposited base body faces the resin body placed on the dyeing tray.

According to the dye-deposited base body manufacturing apparatus exemplified in the present disclosure, the dye-deposited base body is manufactured by printing the dye on the base body by the printing device. The manufactured dye-deposited base body is automatically placed in a pre-determined position on the dyeing tray by the base body placing device. That is, the dye-deposited base body is automatically placed at an appropriate position on the dyeing tray without the operator manually placing the dye-deposited base body on the dyeing tray. Therefore, the efficiency and quality when dyeing the resin body are appropriately improved.

The base body placing device may be incorporated into a dyeing system separately from the printing device. In this case, the base body placing device can also be described as follows. A base body placing device that places the base body at a predetermined position on the resin body in the dyeing tray in a state where the surface on which the dye is printed by the printing device of the dye-deposited base body faces the resin body placed on the dyeing tray.

The base body placing device may be provided with a base body holding unit that holds the base body in a state where the base body holding unit is in contact with a reverse surface opposite to of a printing surface on which the dye is printed among the pair of surfaces of the base body. In this case, the base body is appropriately held in a state where bending, folding, breakage, and the like of the base body are suppressed as compared with the case where one end portion of the base body is held.

The base body placing device may be provided with a ventilation unit. The ventilation unit is formed at a position of the base body holding unit in contact with the reverse surface of the base body. The ventilation unit allows gas to pass through. A control unit of the base body placing device may suck the gas from the ventilation unit by an air flow control device such as a pump or a fan to adsorb and hold the base body on the base body holding unit. In addition, the control unit may place the base body held by the base body holding unit at a predetermined position on the dyeing tray by releasing the suction of gas from the ventilation unit by the air flow control device. In this case, the base body placing device can hold the base body in the base body holding unit with a stronger holding power by utilizing the suction of gas.

The base body may be a member including a metal layer (for example, aluminum foil or the like) and having flexibility. In this case, the thickness of the base body may be 1 μm to 1000 μm. A base body including a metal layer is likely to bend compared to a base body such as paper. However, since the base body is held by the base body holding unit, even a base body that is likely to bend or the like is appropriately held.

The control unit of the base body placing device may place the base body held by the base body holding unit at a predetermined position on the dyeing tray by discharging gas from the ventilation unit by the air flow control device. In this case, for example, even when the base body is difficult to separate from the base body holding unit due to the influence of static electricity generated between the base body holding unit and the base body, the base body is appropriately separated from the base body holding unit by the gas discharged from the ventilation unit. Therefore, the base body is placed on the dyeing tray more appropriately.

The base body placing device may be provided with a sensor that detects whether or not the base body is detached from the base body holding unit. In a case where the sensor detects that the base body is not detached from the base body holding unit when the base body is placed on the dyeing tray, the control unit may place the base body on the dyeing tray by discharging the base body from the ventilation unit. In this case, the base body is appropriately placed on the dyeing tray according to the state of the base body.

However, in a case where the base body is easily separated from the surface of the base body holding unit, the base body placing device may dispose the base body on the dyeing tray only by releasing the suction of the gas from the ventilation unit without discharging the gas from the ventilation unit. In this case, the air flow control device does not have a function of discharging gas.

In addition, the holding of the base body and the release of the holding may be performed by a method different from the method using suction of gas. For example, the base body holding device may hold the base body by interposing a part of the sheet-shaped base body in the thickness direction.

The contact surface of the base body holding unit in contact with the reverse surface of the base body may be a flat surface. In this case, since the base body is held in contact with the flat contact surface of the base body holding unit, the possibility of bending and folding and the like of the base body is further reduced. Therefore, deterioration of dyeing quality and defects in the dyeing step are unlikely to occur.

The ventilation unit may include a groove unit formed on the contact surface of the base body holding unit. The shape of the groove unit may be formed in a shape corresponding to the printing shape of the dye printed on the printing surface of the base body by the printing device (preferably, shape in which an outer peripheral region substantially coincides with an outer peripheral region of the printing shape of the dye). In this case, the groove unit is located on the reverse surface of a printing region of the dye on the base body, so that the printing region of the dye is more firmly held by the base body holding unit. Therefore, since bending and folding and the like in the printed region of the dye are suppressed, the dyeing quality is more unlikely to deteriorate.

The resin body to be dyed may be a substantially disk-shaped spectacle lens. The printing device may print a dye (for example, ink containing a dye) in a circle on the printing surface of the base body. The ventilation unit may include an annular groove unit formed on the contact surface of the base body holding unit. In this case, since the annular groove unit is located on the reverse surface of the dye printed in a circle with respect to the base body, the circular portion on which the dye is printed is more firmly held by the base body holding unit. Therefore, the base body is more appropriately held in the base body holding unit in a state where bending, folding, and the like are suppressed in the portion on which the dye is printed.

It is desirable that the annular groove unit is formed at a position of the contact surface of the base body holding unit in contact with the reverse surface of the circular dye printed on the base body. In addition, a plurality of annular groove units may be formed concentrically. In this case, the reverse surface of the portion on which the dye is printed of the base body is more firmly held by the base body holding unit.

The base body holding unit may be further provided with a placing positioning unit that fits into a tray fitting unit formed at a predetermined position on the dyeing tray. The base body placing device may place the base body at a predetermined position on the dyeing tray in a state where the placing positioning unit is fitted into the tray fitting unit of the dyeing tray. In this case, the relative position of the base body holding unit with respect to the dyeing tray is fixed at a fixed position by fitting the tray fitting unit and the placing positioning unit. Therefore, the base body placing device can more accurately place the base body at a predetermined position on the dyeing tray.

The base body placing device may be further provided with an upside-down turning unit that turns the base body holding unit upside down by rotating the base body holding unit. After holding the base body on the upper part of the base body holding unit, the control unit of the base body placing device may cause the upside-down turning unit to turn the base body holding unit upside down and place the base body at a predetermined position on the dyeing tray. Normally, the printing device prints the dye on the upper surface of the base body. On the other hand, when the dye-deposited base body is placed on the dyeing tray, the dye on the dye-deposited base body is located below the base body, so that it is necessary to cause the dye on the dye-deposited base body to face the resin body placed on the dyeing tray. In the base body placing device, the dye printed on the upper surface of the base body can easily face the resin body by turning the base body holding unit upside down by the upside-down turning unit. Therefore, the dye-deposited base body is appropriately placed on the dyeing tray.

The configuration of the upside-down turning unit can also be appropriately selected. For example, the upside-down turning unit may turn the base body holding unit upside down by rotating the base body holding unit around a horizontally disposed rotation shaft. In this case, the upside-down turning unit has both a function of turning the base body holding unit upside down and a function of moving the position of the base body holding unit to the side opposite to the rotation shaft. Therefore, the step can be easily simplified.

The base body placing device may be further provided with a heating unit that heats the base body holding unit to dry the dye (in the present disclosure, ink containing the dye) printed on the base body held by the base body holding unit. In this case, the base body placing device has a function of drying the dye printed on the base body in addition to a function of placing the dye-deposited base body on the dyeing tray. Therefore, the dyeing step is performed more efficiently and appropriately.

In a case where the base body holding unit is heated to dry the dye on the base body, the ventilation unit may include the above-described annular groove unit. In this case, since the annular groove unit is located on the reverse surface of the dye printed in a circle with respect to the base body, the circular portion on which the dye is printed comes into contact with the base body holding unit more firmly. As a result, heat is easily conducted from the base body holding unit to the dye, so that the dye is dried more appropriately.

In addition, a dyeing system of the present disclosure can also be described as follows. The dyeing system including the dye-deposited base body manufacturing apparatus that manufactures the dye-deposited base body, which is the base body to which the dye to be transferred to the resin body is deposited, used in the dyeing step for dyeing the resin body, a transfer device that transfers the dye of the dye-deposited base body manufactured by the dye-deposited base body manufacturing apparatus to the resin body, and a dye fixing device that fixes the dye deposited on the surface of the resin body to the resin body by heating the resin body to which the dye is transferred by the transfer device, in which the dye-deposited base body manufacturing apparatus includes the printing device that prints the dye on the base body, and the base body placing device that places the base body at a predetermined position on the resin body on the dyeing tray in a state where the surface on which the dye is printed by the printing device of the dye-deposited base body faces the resin body placed on the dyeing tray.

In the present disclosure, as a transfer method in which the transfer device transfers the dye to the resin body, an example of a vapor phase transfer method in which the dye is transferred to the resin body by sublimating a sublimable dye printed on the base body in a state where the resin body and the dye-deposited base body face each other in a vacuum in a non-contact manner. However, it is also possible to change the transfer method. For example, the dye may be transferred to the resin body in a state where the dye-deposited base body is in contact with the resin body. This also applies to second and third aspects illustrated below.

(Second Aspect)

A dye-deposited base body manufacturing apparatus exemplified in the present disclosure manufactures a dye-deposited base body. The dye-deposited base body is used in a dyeing step of dyeing a resin body. A dye to be transferred to the resin body is deposited to a base body to be the dye-deposited base body. The dye-deposited base body manufacturing apparatus exemplified in the present disclosure is provided with the printing device, a cartridge mount unit, and an ink stir unit. The printing device prints ink containing a dye on the base body. The cartridge mount unit mounts a cartridge containing ink supplied to the printing device. The ink stir unit stirs the ink in the cartridge in a state where the cartridge is mounted on the cartridge mount unit.

According to the dye-deposited base body manufacturing apparatus exemplified in the present disclosure, even when the operator does not manually stir the ink, the ink in the cartridge is automatically stirred by the ink stir unit and supplied to the printing device. Therefore, the resin body is efficiently and appropriately dyed regardless of the property that the concentration of the dye in the ink is likely to be non-uniform.

The specific aspect of the cartridge can be appropriately selected. For example, the cartridge may include a built-in bag-shaped member (aluminum pouch or the like) filled with ink. In this case, it is difficult for the ink to dry in the cartridge. In addition, the inside of the flexible cartridge may be directly filled with ink.

The ink stir unit (control unit of the dye-deposited base body manufacturing apparatus) may stir the ink in the cartridge in a case where a predetermined time or more has elapsed after the last stirring of the ink. In this case, since the ink in the cartridge is periodically stirred, the resin body is efficiently and appropriately dyed. For example, the ink stir unit may periodically stir the ink every time the time after the last stirring of the ink reaches a predetermined time. In addition, the ink stir unit may stir the ink in a case where a predetermined time or more has elapsed after the last stirring of the ink and a printing start instruction is input to the printing device.

The ink stir unit (control unit of the dye-deposited base body manufacturing apparatus) may stir the ink in the cartridge while printing by the printing device is not performed. In this case, during printing, the ink already stirred is supplied to the ink jet head, so that the dyeing quality is improved. In addition, defects such as ink clogging are unlikely to occur.

The ink stir unit (control unit) may stir the ink in the cartridge after power is provided to the printing device and before printing is performed by the printing device. That is, the ink stir unit may stir the ink when the power is provided to the printing device. In this case, the ink in which the substance is settled while the power to the printing device is shut off is automatically stirred by the ink stir unit, and then printing by the printing device is performed. Therefore, the resin body is dyed efficiently and appropriately.

It is also possible to change the timing at which the ink stir unit stirs the ink in the cartridge. For example, the ink stir unit may stir the ink every time the number of times that the printing device prints the ink reaches a predetermined number of times.

The ink stir unit may stir the ink in the cartridge by inclining the cartridge mounted on the cartridge mount unit from a used state when printing and then returning the cartridge to the used state. In this case, the ink in the cartridge can be appropriately stirred without inserting any member inside the cartridge.

However, it is also possible to change the method in which the ink stir unit stirs the ink in the cartridge. For example, the ink stir unit may stir the ink in the cartridge by inserting a screw or the like for stirring the ink into the cartridge and driving the screw.

A plurality of cartridges may be mounted on the cartridge mount unit. The ink stir unit may simultaneously stir the ink of the plurality of cartridges mounted on the cartridge mount unit. In this case, the ink is stirred more efficiently than in the case where the ink in each of the plurality of cartridges is stirred individually.

The method for simultaneously stirring the ink of the plurality of cartridges can be appropriately selected. For example, the ink stir unit may simultaneously stir the ink of the plurality of cartridges by collectively inclining the entire cartridge mount unit in which the plurality of cartridges are mounted. In addition, the ink stir unit may simultaneously stir the ink of the plurality of cartridges by collectively driving the plurality of screws inserted in each of the plurality of cartridges by one actuator (for example, motor or the like).

The dye-deposited base body manufacturing apparatus may be further provided with a weight sensor that measures the weight of the cartridge mounted on the cartridge mount unit. The control unit of the dye-deposited base body manufacturing apparatus may generate remaining ink amount information about the remaining amount of ink in the cartridge based on the weight of the cartridge measured by the weight sensor.

As a general method for estimating the remaining amount of ink in the cartridge, a method for estimating the remaining amount of ink based on the number of times the ink is ejected from the ink jet head is known. However, the error between the remaining amount of ink estimated based on the number of times the ink is ejected and the actual remaining amount of ink is likely to increase. Therefore, in a case of estimating the remaining amount of ink based on the number of times ink is ejected, in order to prevent defects from generating in the ink jet head due to printing in a state where the ink is completely used up, it is necessary to recommend the operator to replace the cartridge in a state where an estimated remaining amount of ink is sufficient. In this case, the amount of ink remaining in the cartridge and discarded increases. In particular, since ink containing the dye for dyeing the resin body is expensive, it is very important to reduce the amount of ink discarded.

On the other hand, in a case where the remaining ink amount information is generated based on the actually measured weight of the cartridge, the information is generated with higher accuracy than the case where the remaining amount is estimated using the number of times the ink is ejected. Therefore, the amount of ink discarded is appropriately reduced.

A specific method of using the remaining ink amount information generated based on the weight of the cartridge can be appropriately selected. For example, the control unit may output the generated remaining ink amount information by a method such as display on the display unit or output of voice. The control unit may notify the operator of the information of the remaining amount of ink estimated based on the weight of the cartridge by a method such as display on the display unit. In addition, the control unit may perform at least one of an operation of recommending the operator to replace the cartridge and an operation of stopping printing by the printing device until the cartridge is replaced, based on information of the remaining amount of ink estimated based on the weight of the cartridge.

The weight sensor may only measure the weight of the cartridge. In addition, the weight sensor may measure the total weight of the cartridge and a member fixed to the cartridge (for example, insertion unit into which the cartridge is inserted). Even in this case, when the weight of the member fixed to the cartridge is known, remaining ink amount information is appropriately generated based on the weight measured by the weight sensor.

The control unit may control the ink stirring operation in the cartridge by the ink stir unit based on the weight of the cartridge measured by the weight sensor. The weight of the cartridge measured by the weight sensor varies depending on the weight of the ink remaining in the cartridge. Therefore, by controlling the ink stirring operation by the ink stir unit based on the measurement result by the weight sensor, an appropriate stirring operation is performed depending on the weight of the ink remaining in the cartridge.

A specific method for controlling the operation of the ink stir unit based on the weight of the cartridge measured by the weight sensor can be appropriately selected. For example, the control unit may change the interval of time for stirring the ink by the ink stir unit based on the weight of the cartridge measured by the weight sensor. In addition, the control unit may change the number of times the ink is stirred by the ink stir unit or the like based on the weight of the cartridge measured by the weight sensor.

The control unit may adjust the zero point of the weight sensor (that is, process of adjusting the measurement result when the weight applied to the weight sensor is zero to zero (origin)) in a state where the cartridge is inclined by 90 degrees or more from the used state by the ink stir unit. When the cartridge is inclined by 90 degrees or more from the used state by the ink stir unit, the weight applied to the weight sensor from the cartridge is zero. By adjusting the zero point of the weight sensor in this state, the accuracy of measuring the weight of the cartridge by the weight sensor is appropriately improved. That is, the configuration in which the cartridge is inclined to stir the ink is also used for adjusting the zero point of the weight sensor, so that the accuracy of measuring the weight of the cartridge can be efficiently improved.

In a case where the zero point of the weight sensor is adjusted, the angle at which the ink stir unit is inclined the cartridge from the used state may be larger than 90 degrees. In this case, when the zero point of the weight sensor is adjusted, the possibility that the weight of the cartridge is added to the weight sensor is more appropriately reduced.

The cartridge mount unit may be provided with a linear motion guide that restricts the movable direction of the cartridge in the used state in the vertical direction. The weight sensor may measure the weight of the cartridge in a state where the movable direction is restricted by the linear motion guide. In this case, the accuracy of measuring the cartridge weight by the weight sensor is improved. Therefore, the accuracy of the remaining ink amount information generated based on the measurement result by the weight sensor is further improved.

In addition, it is also possible to change the method of adjusting the zero point of the weight sensor. For example, the dye-deposited base body manufacturing apparatus may be provided with biasing means (for example, spring or the like) capable of biasing the cartridge mounted on the cartridge mount unit upward. The control unit may adjust the zero point of the weight sensor in a state where the cartridge is biased upward by the biasing means.

In addition, a dyeing system of the present disclosure can also be described as follows. The dyeing system including the dye-deposited base body manufacturing apparatus that manufactures the dye-deposited base body, which is the base body to which the dye to be transferred to the resin body is deposited, used in the dyeing step for dyeing the resin body, a transfer device that transfers the dye of the dye-deposited base body manufactured by the dye-deposited base body manufacturing apparatus to the resin body, and a dye fixing device that fixes the dye deposited on the surface of the resin body to the resin body by heating the resin body to which the dye is transferred by the transfer device, in which the dye-deposited base body manufacturing apparatus includes the printing device that prints ink containing dye on the base body, the cartridge mount unit that mounts the cartridge containing the ink supplied to the printing device, and the ink stir unit that stirs the ink in the cartridge in a state where the cartridge is mounted on the cartridge mount unit.

(Third Aspect)

A dye-deposited base body manufacturing apparatus exemplified in the present disclosure manufactures a dye-deposited base body. The dye-deposited base body is used in a dyeing step of dyeing a resin body. A dye to be transferred to the resin body is deposited to a base body to be the dye-deposited base body. The dye-deposited base body manufacturing apparatus exemplified in the present disclosure is provided with the printing device, the conveyance device, and the base body movement device. The printing device prints a dye for dyeing the resin body (for example, ink containing a dye) on the base body. The conveyance device conveys the dyeing tray on which the resin body is placed. The base body movement device moves the dye-deposited base body on which the dye is printed by the printing device from the printing position by the printing device to a side of the conveyance device.

According to the dye-deposited base body manufacturing apparatus exemplified in the present disclosure, the dye-deposited base body on which the dye is printed by the printing device is automatically moved from the printing position to a side of the conveyance device by the base body movement device. Therefore, it is not necessary for the operator to manually move the base body from the printing position. Therefore, the resin body is dyed more efficiently and appropriately.

The dye-deposited base body manufacturing apparatus may be further provided with the base body placing device that places the base body at a predetermined position on the dyeing tray installed in the conveyance device. The base body movement device may deliver the dye-deposited base body on which the dye is printed by the printing device from the printing position by the printing device to the base body placing device. In this case, the dye-deposited base body on which the dye is printed by the printing device is automatically conveyed in order by the base body movement device, the base body placing device, and the conveyance device. Therefore, the burden of work performed by the operator is further reduced.

The base body placing device and the base body movement device may be an integrated device. That is, one device may have both a function of moving the base body from the printing position to a side of the conveyance device and a function of placing the moved base body on the dyeing tray in the conveyance device.

The printing device may be provided with a carriage that moves the head that ejects the dye with respect to the base body in the main scanning direction. The base body movement device may also serve as a sub-scanning device that moves the base body in a sub-scanning direction intersecting the main scanning direction during printing of the dye by the printing device. In this case, both the sub-scanning during printing and the movement of the base body from the printing position to a side of the conveyance device are appropriately performed in a state where the configuration of the device is suppressed from being complicated. In addition, the space for installing the device can be easily reduced as compared with the case where the sub-scanning device is provided separately from the base body movement device.

The printing device may be provided with an operation unit that is operated by an operator to input an operation instruction and faces the front side of the device. The operation unit may be disposed in a state where the operator can operate it from the front side of the printing device. An operation instruction for performing maintenance on the printing device may be input to the operation unit facing the front side. The operation unit facing the front side may be an operation panel (for example, operation panel having a plurality of buttons, touch panel, and the like) capable of inputting a plurality of types of operation instructions. The conveyance device may be disposed on the side opposite to the front side (that is, the rear side) of the printing device. In this case, the base body movement device moves the dye-deposited base body on which the dye is printed to the rear side of the printing device. The operator needs to perform maintenance on the printing device from the front side facing the operation unit. Therefore, by disposing the conveyance device on the rear side of the printing device, the operator can easily perform maintenance on the printing device from the front side of the printing device. That is, the conveyance device or the like does not interfere with the operator during maintenance on the printing device by the operator. In addition, since it is not necessary to form a space for the operator to perform maintenance in the vicinity of the conveyance device, it is easy to reduce the space for installing the device. Since it is not necessary to bypass the conveyance path of the conveyance device in order to secure a space for performing maintenance, it is possible to prevent the conveyance path from being long.

The operation unit described above may face the front side so as to be operated from the front side by the operator. Therefore, the position where the operation unit is provided may be disposed on the front surface of the housing of the printing device, and the operation unit may be disposed so as to face the front side on a surface different from the front surface (for example, the upper surface of the housing).

The base body movement device may be provided with a base body support unit and a suction hole. The base body support unit has a support surface on which the base body is placed. The suction hole is formed on the support surface of the base body support unit. The base body may be adsorbed on the support surface of the base body support unit by sucking the gas from the suction holes. In this case, the base body movement device can appropriately support the base body on the base body support unit by suppressing the occurrence of damage and deformation of the base body by utilizing the suction of gas.

The base body movement device may be further provided with a moving drive unit (for example, slider or the like) that moves the base body support unit in at least one-dimensional direction. In this case, the base body movement device can appropriately move the base body by moving the base body support unit that supports the base body by the moving drive unit. That is, unlike the case where the base body is moved by a pinch roller or the like, the base body is appropriately moved in a state where bending and folding and the like of the base body are suppressed.

However, it is also possible to change the configuration of the base body movement device. For example, the base body movement device may move the base body from the printing position to the conveyance device side by at least one of a pinch roller, a robot arm, and the like.

A plurality of suction holes may be provided at least along an outer peripheral portion of the support surface of the base body support unit. In this case, the base body is easily adsorbed on the entire support surface of the base body support unit. Therefore, the possibility of the occurrence of damage and deformation of the base body is further reduced.

The base body may include a metal layer (for example, aluminum foil, and the like). The base body may be flexible. The thickness of the base body may be 1 μm to 1000 μm. In a case where a base body including a metal layer is moved by a pinch roller, the base body may be bent due to the stress of the force applied from the pinch roller to the base body. On the other hand, by moving the base body support unit in a state where the base body is adsorbed on the support surface of the base body support unit, bending of the base body is appropriately suppressed. The base body may be formed by laminating a dye holding layer (for example, layer of a hydrophilic polymer film) that enhances the holding power of the printed dye on a metal layer. In this case, the dye printed on the base body is likely to be appropriately held.

In addition, a dyeing system of the present disclosure can also be described as follows. The dyeing system including the dye-deposited base body manufacturing apparatus that manufactures the dye-deposited base body, which is the base body to which the dye to be transferred to the resin body is deposited, used in the dyeing step for dyeing the resin body, a transfer device that transfers the dye of the dye-deposited base body manufactured by the dye-deposited base body manufacturing apparatus to the resin body, and a dye fixing device that fixes the dye deposited on the surface of the resin body to the resin body by heating the resin body to which the dye is transferred by the transfer device, in which the dye-deposited base body manufacturing apparatus includes the printing device that prints the dye on the base body, and the conveyance device that conveys the dyeing tray on which the resin body is placed, and the base body movement device that moves the dye-deposited base body on which the dye is printed by the printing device from the printing position by the printing device to a side of the conveyance device.

Embodiment

Hereinafter, one of the typical embodiments according to the present disclosure will be described with reference to the drawings. A dyeing system 1 automatically and continuously dyes the resin body. In the present embodiment, the resin body to be dyed is a plastic lens L (refer to FIG. 2 and the like) used for spectacle. However, at least a part of the techniques exemplified in the present disclosure can also be applied to a case of dyeing a resin body other than the lens L. For example, in a case of dyeing various resin bodies such as a goggle, a mobile phone cover, a light cover, an accessory, a toy, a film (for example, thickness of 400 μm or less), a plate material (for example, thickness of 400 μm or more), and the like, it is also possible to apply at least a part of the techniques illustrated in the disclosure. The resin body to be dyed also includes a resin body added to a member (for example, wood or glass) different from the resin body. In addition, the dyeing system 1 of the present embodiment dyes while continuously conveying a plurality of resin bodies. However, at least a part of the techniques exemplified in the present disclosure can be adopted in a dyeing system in which resin bodies are conveyed one set for dyeing.

(System Configuration)

The system configuration of the dyeing system 1 of the present embodiment will be schematically described with reference to FIG. 1. The dyeing system 1 of the present embodiment is provided with a conveyance device 10, a preparation unit 20, a dye-deposited base body manufacturing apparatus 30, a transfer device 40, a dye fixing device 50, a coating device 60, and a control device 70.

The conveyance device 10 conveys a dyeing tray 80 (refer to FIGS. 2 and 3) on which the lens L, which is a resin body, is placed, to each device in the dyeing system 1. Specifically, the conveyance device 10 of the present embodiment continuously conveys a plurality of dyeing trays 80 in the dyeing system 1. The conveyance device 10 of the present embodiment conveys the dyeing tray 80 in the order of the preparation unit 20, the dye-deposited base body manufacturing apparatus 30, the transfer device 40, the dye fixing device 50, and the coating device 60 (that is, from left to right in FIG. 1).

The preparation unit 20 prepares before actually performing the transfer and fixing of the dye to the lens L. Specifically, the preparation unit 20 of the present embodiment is provided with an optical characteristic measuring device 21 and a rotation device 22.

The optical characteristic measuring device 21 is provided with a measuring optical system for measuring the optical characteristics of the lens L. The optical characteristic measuring device 21 reads the optical characteristics of the lens L (for example, spherical power, astigmatic power, astigmatic axis angle, prism power, and the like) by projecting a measured luminous flux on the lens L and receiving the measured luminous flux passing through the lens L. By measuring the astigmatic axis angle of the lens L, the angle in the rotation direction of the lens L is determined. Since a known configuration can be adopted for the optical characteristic measuring device 21, detailed description thereof will be omitted (configuration of the optical characteristic measuring device 21 is described in, for example, JP-A-2012-107910).

The rotation device 22 is provided with a support unit that supports the lens L and an actuator (for example, motor or the like) that rotates the lens L supported by the support unit. The rotation device 22 defines the rotation direction of the lens L by rotating the lens L. The rotation device 22 of the present embodiment defines the rotation direction of the lens L as a target direction by rotating the lens L based on the angle of the rotation direction of the lens L measured by the optical characteristic measuring device 21. In a case where gradation dyeing is performed and the lens L does not have a target shape centered on the geometric center axis, the dyeing system 1 of the present embodiment adjusts the angle of the lens L with respect to the angle of the ink (dye) printed on the base body S by rotating the lens L.

The dye-deposited base body manufacturing apparatus 30 manufactures a dye-deposited base body used in the dyeing step of dyeing the resin body (lens L). The dye-deposited base body includes a sheet-shaped base body S (refer to FIG. 4) and a dye deposited on one surface of the base body S. In the present embodiment, the base body S has a metal layer (layer of aluminum foil in the present embodiment) and is flexible. Specifically, the base body S is formed by laminating a dye holding layer (in the present embodiment, layer of a hydrophilic polymer film) for enhancing the holding power of the printed dye on a metal layer. Therefore, the dye printed on the base body S is likely to be appropriately held. The thickness of the base body S in the present embodiment is 1 μm to 1000 μm. However, other materials such as paper, glass plate, heat-resistant resin, and ceramic can be used as the material of the base body S.

Figure 4:
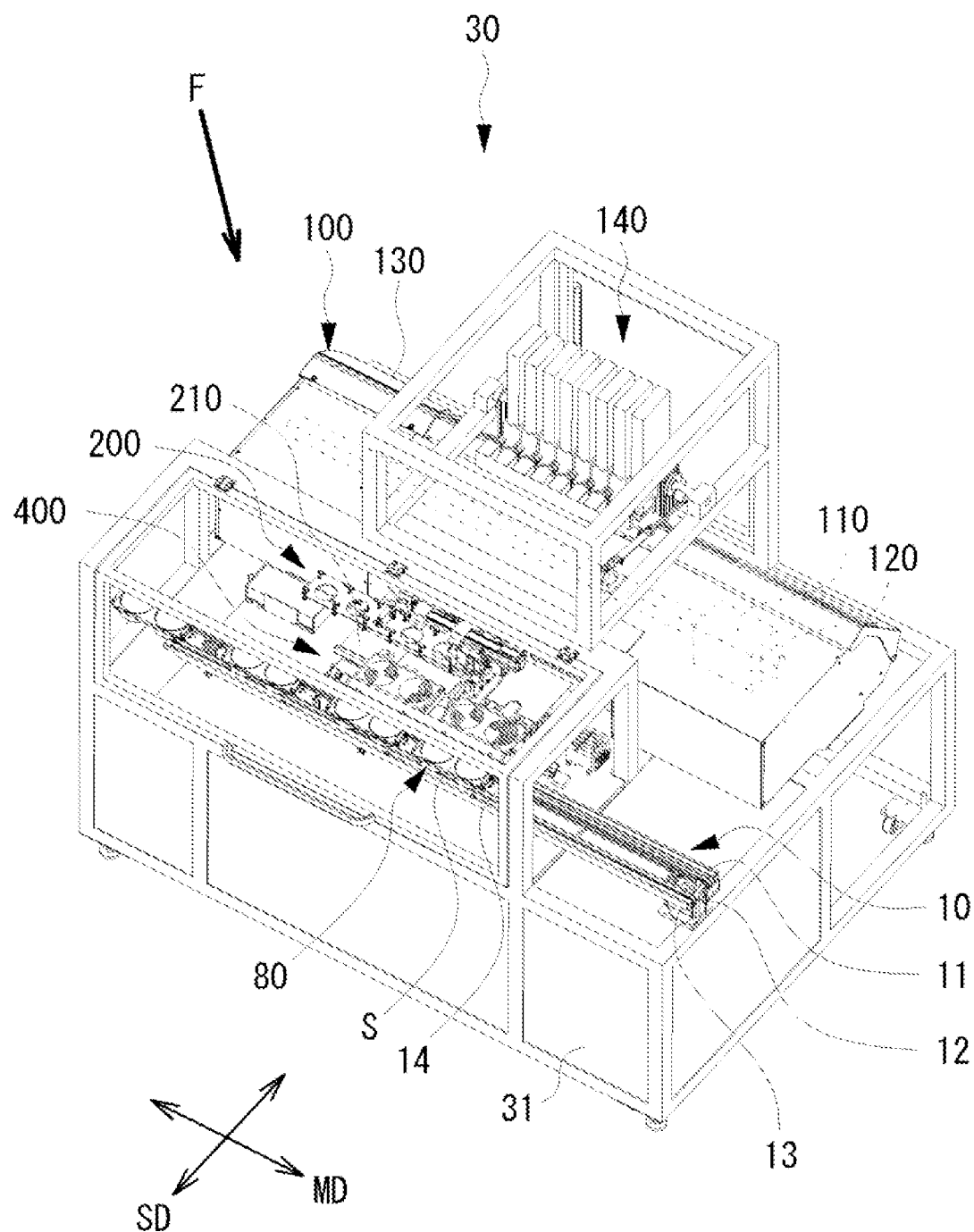
FIG. 4 is a perspective view of a dye-deposited base body manufacturing apparatus 30 when viewed from diagonally rear left.

The dye-deposited base body manufacturing apparatus 30 of the present embodiment is provided with a printing device 100 (refer to FIG. 4). The printing device 100 manufactures a dye-deposited base body by printing an ink containing a dye on the base body S. In the dyeing system 1 of the present embodiment, in order to appropriately transfer the dye to the lens L while preventing the dye from agglomerating, the dye on the base body S is transferred (deposited) to the surface of the lens L by heating the dye on the base body S in a state where the base body S and the lens L are separated from each other and face each other in a vacuum (including substantially vacuum) environment (the dyeing method in the present embodiment is referred to as a vapor phase transfer dyeing method). Therefore, in the printing device 100, an ink jet printer that prints ink containing a sublimation dye on the base body S is used. In addition, the printing device 100 can also print ordinary ink that does not contain a sublimation dye on the base body S. The printing device 100 executes printing based on print data created by the control device 70 which is an information processing device (in the present embodiment, personal computer (hereinafter referred to as "PC"). As a result, an appropriate amount of ink (dye) is deposited to an appropriate position of the base body S. It is also easy to prepare the dye-deposited base body S for performing gradation dyeing.

It is also possible to change the configuration of the printing device 100. For example, the printing device may be a laser printer. In this case, a toner may contain a sublimation dye. In addition, instead of the printing device 100, the dye may be deposited to the base body S by a dispenser (liquid quantitative coating device), a roller, or the like. Details of the dye-deposited base body manufacturing apparatus 30 will be described later.

The transfer device 40 transfers the dye from the base body S to the lens L in a state where the surface on which the dye is deposited of the base body S faces the lens L. As described above, in the present embodiment, the dye is transferred from the base body S to the lens L by the vapor phase transfer method. However, it is also possible to change the method of transferring the dye to the lens L. For example, the dye may be transferred from the base body S to the lens L in a state where the dye of the base body S and the lens L are in contact with each other.

The dye fixing device 50 heats the lens L to which the dye is transferred by the transfer device 40 to fix the dye deposited on the surface of the lens L to the resin body. The dye fixing device 50 of the present embodiment heats the lens L by irradiating the lens L with a laser beam which is an electromagnetic wave. However, a device (for example, oven or the like) that irradiates the lens L with an electromagnetic wave other than the laser beam may be used as the dye fixing device.

The coating device 60 coats the surface of the lens L on which the dye is fixed by the dye fixing device 50. A specific method for the coating device 60 to coat the lens L can be appropriately selected. For example, at least one of a spray method, an ink jet method, a spin method, a dip method, and the like may be adopted as the coating method. The type of coating may be appropriately selected from many types (for example, hard coat, antireflection coat, water repellent coat, primer coat, and the like).

The control device 70 controls various types of control in the dyeing system 1. As the control device 70, various information processing devices (for example, at least one of a PC, a server, a mobile terminal, and the like) can be used. The control device 70 is provided with a controller (for example, CPU or the like) 71 that controls control, and a database 72 that stores various data. It is also possible to change the configuration of the control device 70. First, a plurality of devices may cooperate to function as the control device 70. For example, a control device that controls various types of control in the dyeing system 1 and a control device including the database 72 may be different devices. In addition, the controllers of a plurality of devices may cooperate to execute various types of control in the dyeing system 1. For example, in many cases, at least one of the conveyance device 10, the optical characteristic measuring device 21, the rotation device 22, the dye-deposited base body manufacturing apparatus 30, the transfer device 40, the dye fixing device 50, and the coating device 60 includes a controller. In this case, the controller of the control device 70 and the controller of another device may cooperate to control the dyeing system 1.

(Dyeing Tray)

Figure 2:
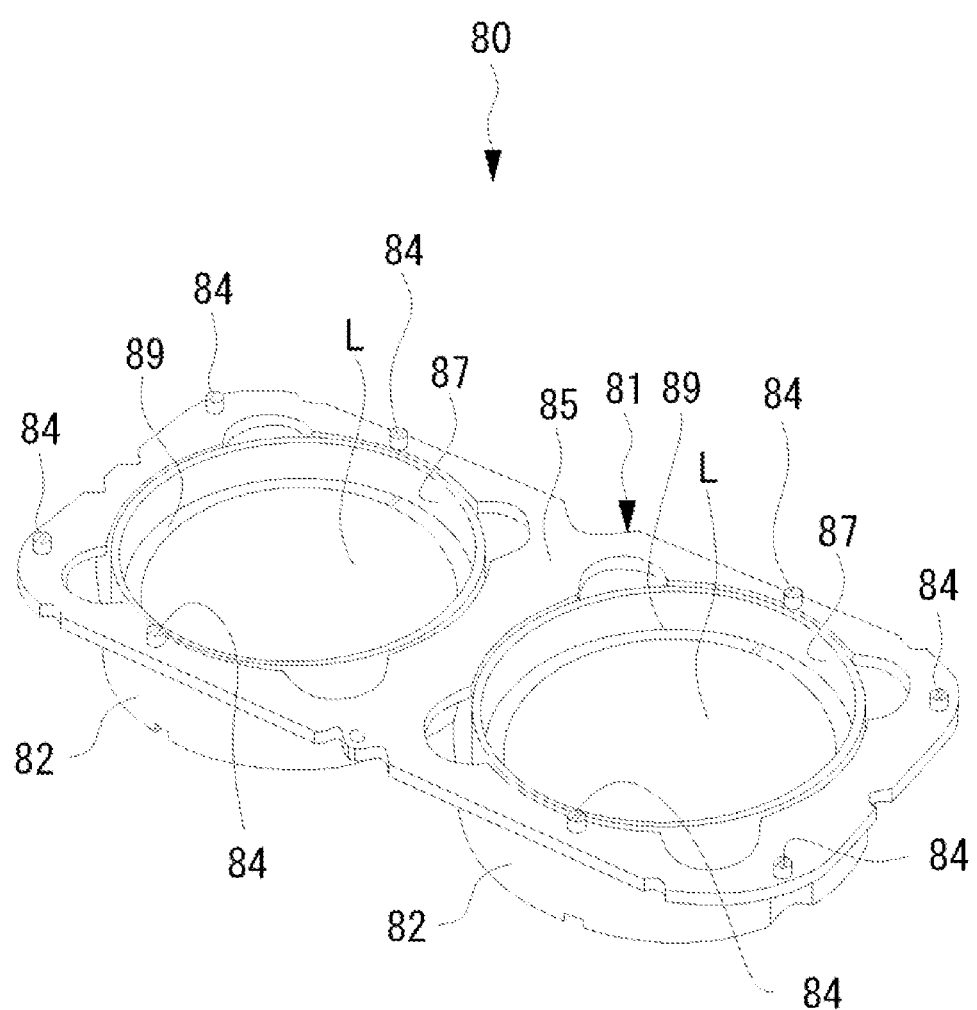
FIG. 2 is a perspective view of a dyeing tray 80 in a state where two lenses L are installed and a base body S is not installed when viewed from diagonally upper right.
Figure 3:
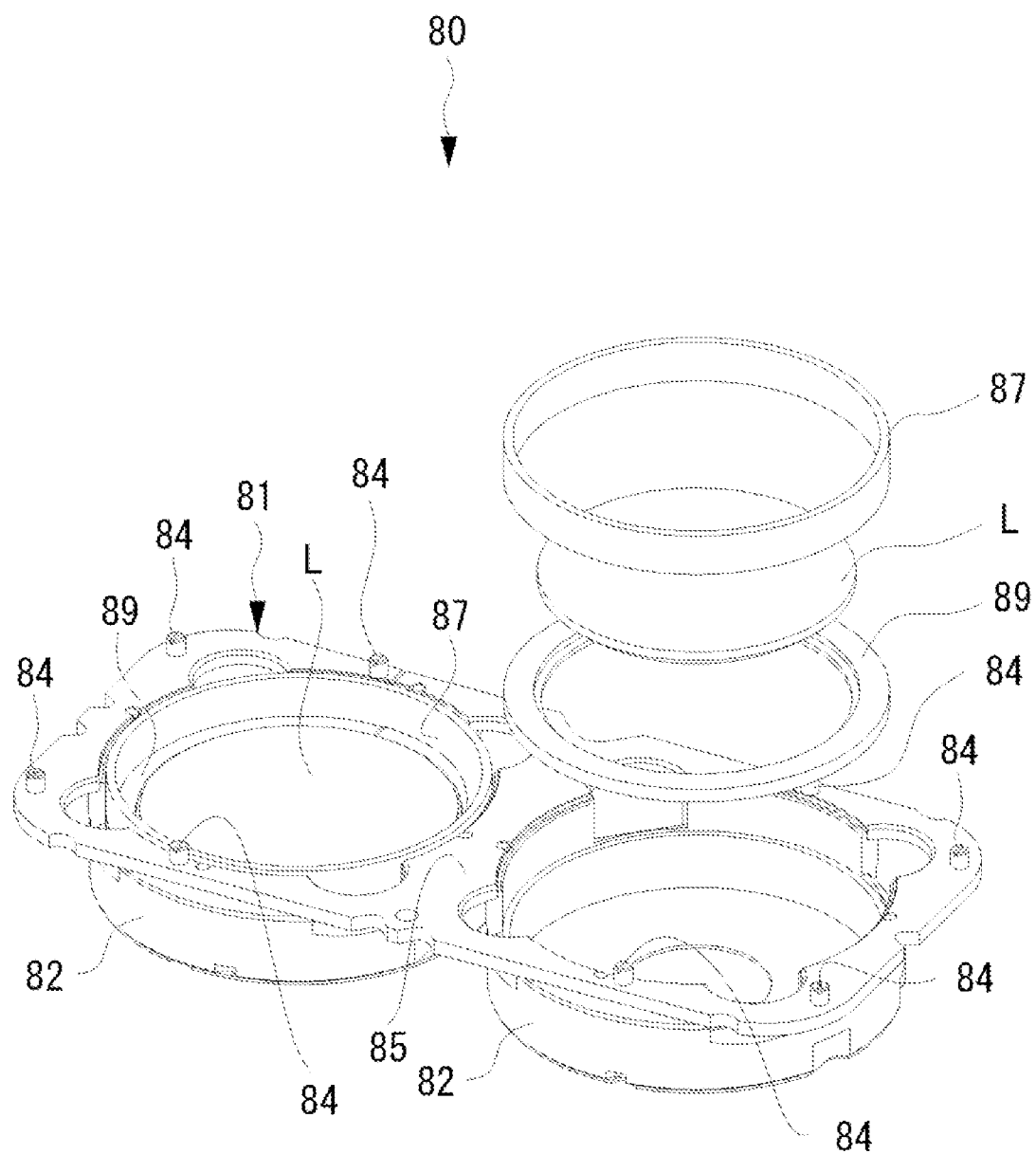
FIG. 3 is a perspective view of the dyeing tray 80, illustrating a placing frame 89, a lens L, and a spacer 87 mounted on one of two mount units 82 in FIG. 2 in an exploded manner.

The dyeing tray 80 used in the dyeing system 1 of the present embodiment will be described with reference to FIGS. 2 and 3. FIG. 2 is a perspective view of the dyeing tray 80 in a state where the two lenses L are installed (placed) and the base body S is not installed. FIG. 3 is a perspective view of the dyeing tray 80 illustrating a placing frame 89, the lens L, and a spacer 87 mounted on one of two mount units 82 in an exploded manner.

As illustrated in FIGS. 2 and 3, the dyeing tray 80 of the present embodiment is provided with a tray main body 81, a placing frame 89, and a spacer 87. The tray main body 81, the placing frame 89, and the spacer 87 are all made of a material capable of withstanding high temperature and low pressure (substantially vacuum). The resin body (lens L in the present embodiment) to be dyed is placed on the placing frame 89. The placing frame 89 of the present embodiment is formed in a ring shape having an outer diameter slightly larger than that of the lens L. The spacer 87 extends upward in a tubular shape (cylindrical shape) from the outer peripheral portion of a portion where the lens L is placed of the placing frame 89. The mount unit 82 is formed on the tray main body 81. The placing frame 89 and the spacer 87 are detachably mounted on the mount unit 82. In the present embodiment, two mount units 82 are formed on one tray main body 81. Therefore, a pair of (left and right) lenses L used for one spectacle are dyed in a state of being placed on one dyeing tray 80.

The base body placing unit 85 on which the sheet-shaped base body S (refer to FIG. 4) to which a sublimation dye is deposited is placed is formed on the outer side of the tray main body 81 above the mount unit 82. By placing the base body S on the base body placing unit 85, the surface on which the sublimation dye is deposited of the base body S faces the lens L placed on the placing frame 89.

The tubular spacer 87 forms a space between the base body S placed on the base body placing unit 85 and the lens L placed on the placing frame 89. Therefore, the sublimation dye is appropriately transferred from the base body S to the lens L through the space formed by the spacer 87. When the placing frame 89 and the spacer 87 are mounted on the mount unit 82, the upper end portion of the spacer 87 projects upward from the placing surface of the base body placing unit 85. Therefore, the base body S placed on the base body placing unit 85 and the upper end portion of the spacer 87 are easily brought into close contact with each other, so that the sublimated dye is unlikely to leak to the outside.

In the tray main body 81, at a position outside the mount unit 82 (specifically, outside the base body placing unit 85), a projection unit 84 is provided so as to project upward from the placing surface of the base body placing unit 85 on which the base body S is placed.

The shape of the base body S of the present embodiment is a rectangular sheet that covers both of the two mount units 82. In the present embodiment, a plurality (8 pieces) of projection units 84 are formed at positions along an outer periphery of the base body S in a state of being placed at an appropriate position on the dyeing tray 80 (that is, a state of being appropriately placed on the base body placing unit 85). Therefore, by placing the base body S in the region (base body placing unit 85) surrounded by the plurality of projection units 84, the base body S is appropriately positioned with respect to the lens L. In addition, the possibility that the position of the placed base body S is displaced with respect to the lens L is reduced. That is, at least a part of the plurality of projection units 84 in the present embodiment (in the present embodiment, all the projection units 84) functions as a positioning unit for positioning the base body S with respect to the lens L.

In addition, at least a part of the plurality of projection units 84 in the dyeing tray 80 (in the present embodiment, all the projection units 84) fits into a placing positioning unit 413 (refer to FIG. 11) formed in a base body holding unit 410 of a base body placing device 400 described later. As a result, the relative position of the base body holding unit 410 with respect to the dyeing tray 80 is fixed at a predetermined position. That is, the projection unit 84 in the present embodiment functions as a tray fitting unit that fits into the placing positioning unit 413 of the base body holding unit 410. The details will be described later.

In a case where the plurality of projection units 84 are provided on the tray main body 81, it goes without saying that the number of projection units 84 is not limited to eight. In addition, it is also possible to change the shape of the projection unit 84. For example, the projection unit may be a rib-shaped member extending upward from a position along the outer periphery of the base body S.

(Dye-Deposited Base Body Manufacturing Apparatus)

Figure 5:
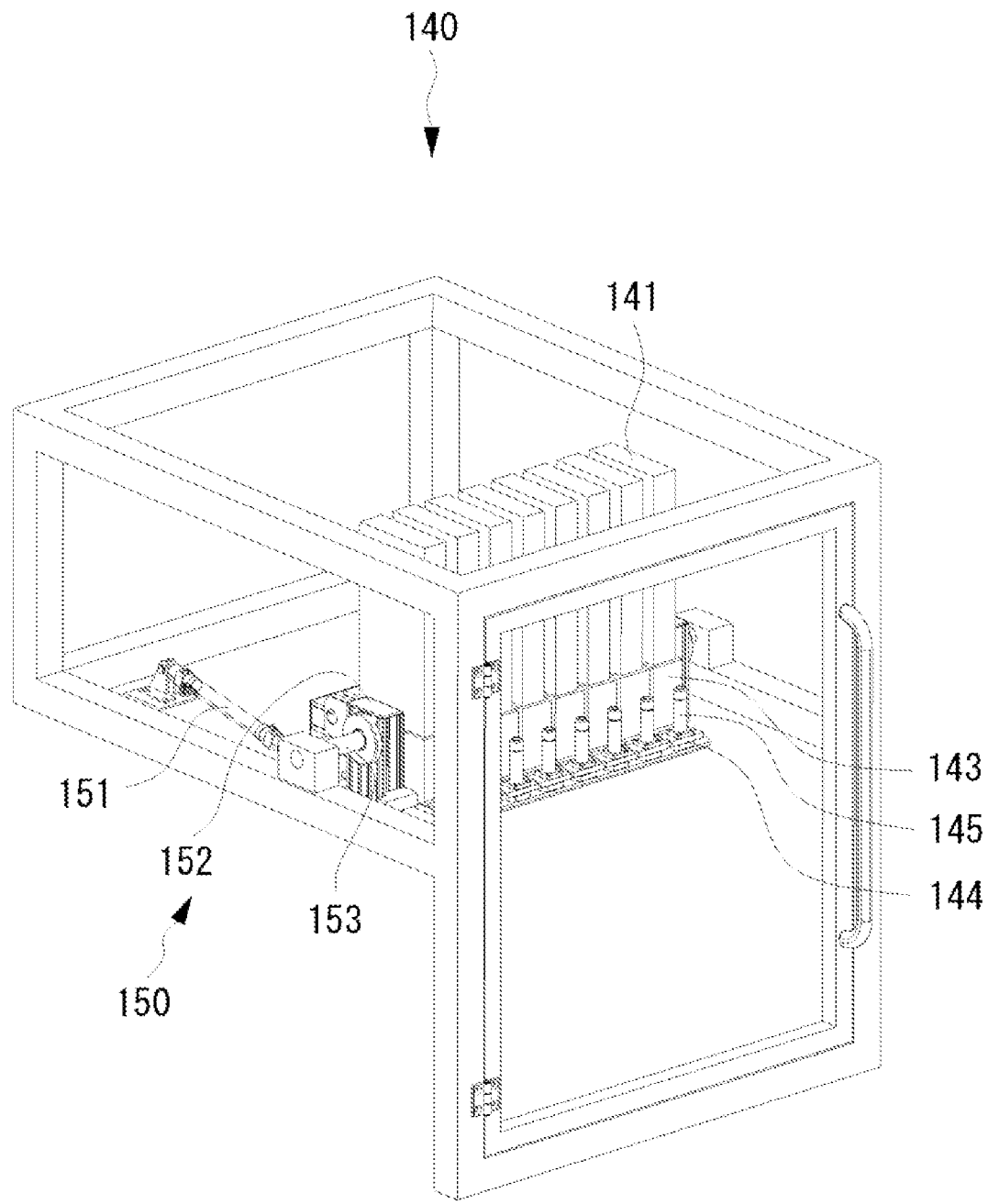
FIG. 5 is a perspective view of a cartridge mount unit 140 and an ink stir unit 150 in a used state when viewed from diagonally front left.
Figure 11:
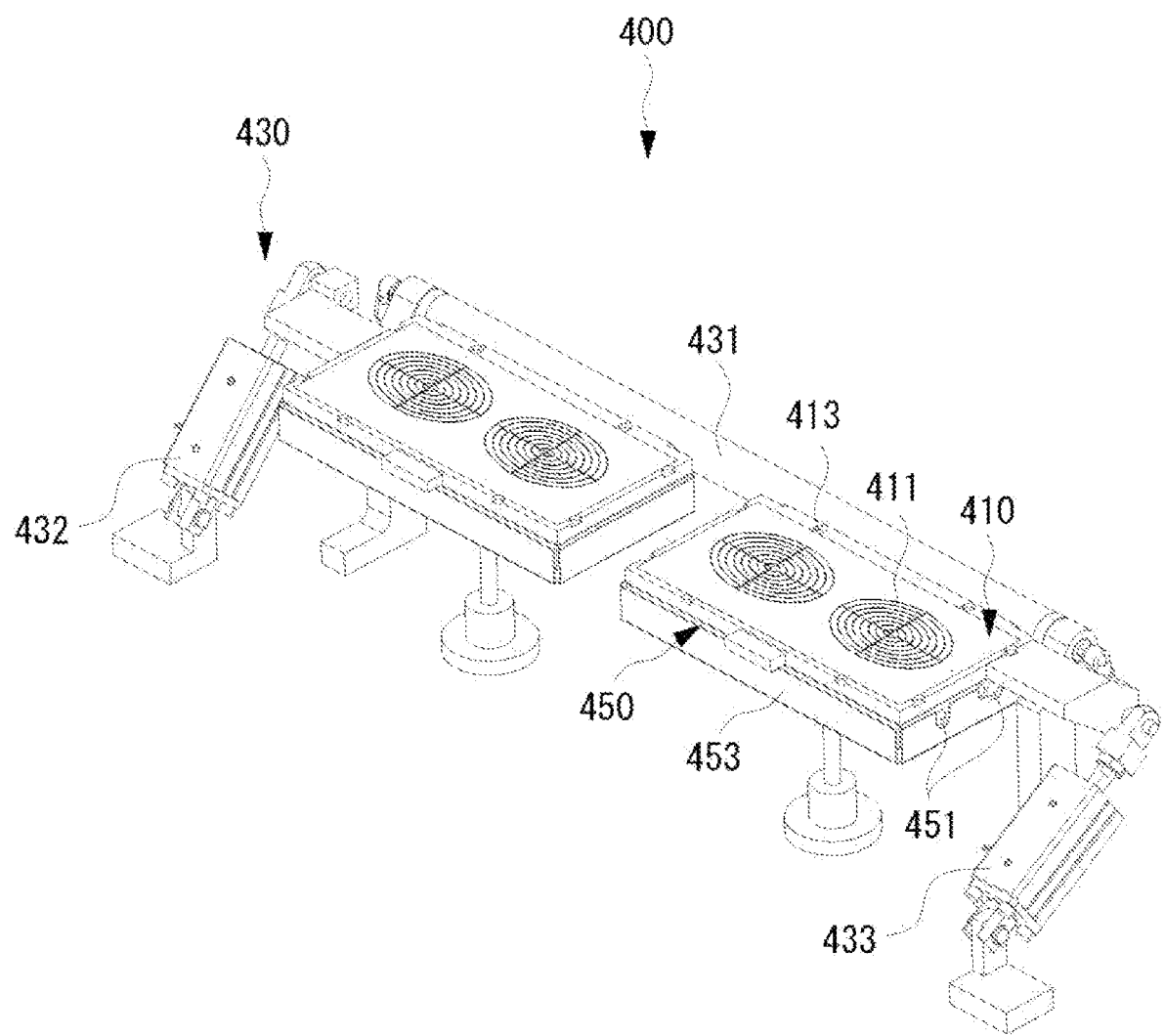
FIG. 11 is a perspective view of a base body placing device 400 in a state where a base body holding unit 410 is not turned upside down, when viewed from diagonally front right (direction of arrow F in FIG. 4).
Figure 12:
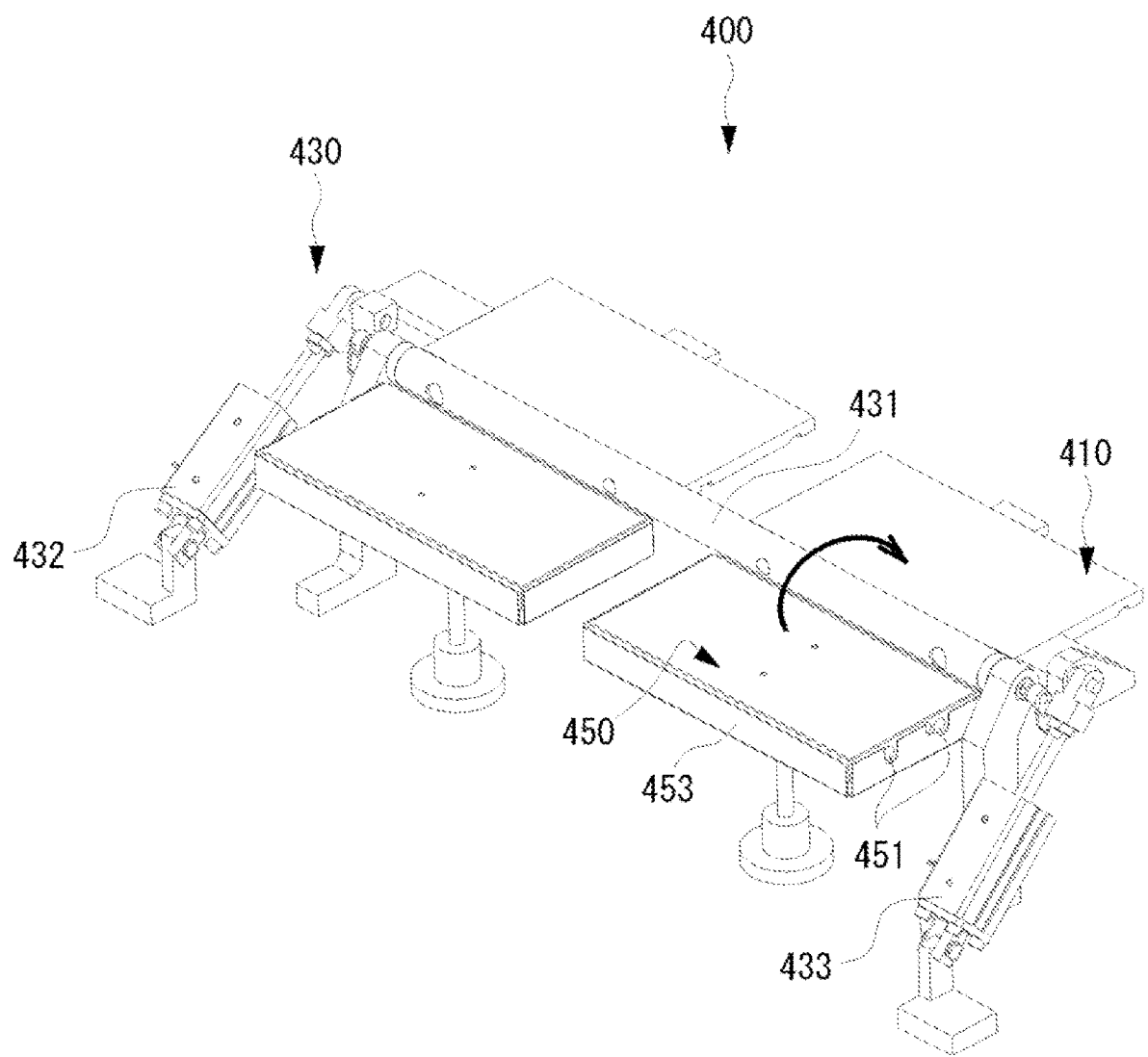
FIG. 12 is a perspective view of the base body placing device 400 in a state where the base body holding unit 410 is turned upside down, when viewed from diagonally front right (direction of arrow F in FIG. 4).

The dye-deposited base body manufacturing apparatus 30 of the present embodiment will be described with reference to FIGS. 4 to 12. In the following description, the upper right side of the paper surface in FIG. 4 is a front side of the dye-deposited base body manufacturing apparatus 30, and the lower left side of the paper surface is a rear side of the dye-deposited base body manufacturing apparatus 30. The lower right side of the paper surface in FIG. 4 is a left side of the dye-deposited base body manufacturing apparatus 30, and the upper left side of the paper surface is a right side of the dye-deposited base body manufacturing apparatus 30. FIGS. 4, 8, 9, and 10 are perspective views of each device when viewed from diagonally rear left. On the other hand, FIG. 5 is a perspective view of the device when viewed from diagonally front left. In addition, FIGS. 11 and 12 are perspective views of the device, when viewed from diagonally front right (direction of arrow F in FIG. 4).

As illustrated in FIG. 4, the dye-deposited base body manufacturing apparatus 30 of the present embodiment is provided with a printing device 100, a base body delivery device 200, a base body movement device 300 (refer to FIGS. 9 and 10), and a base body placing device 400. The base body movement device 300 is not illustrated in FIG. 4 because the base body movement device 300 is in a state of being moved inside the printing device 100 in FIG. 4. The base body movement device 300 is disposed closer to the printing device 100 than the base body delivery device 200. Each of the printing device 100, the base body delivery device 200, the base body movement device 300, and the base body placing device 400 is assembled in a housing 31. In addition, the conveyance device 10 is also assembled in the housing 31.

The printing device 100 prints ink containing a dye on the sheet-shaped base body S. The base body delivery device 200 delivers the base body S from a base body stock unit 210 that stocks the base body S on which ink is not printed to the base body movement device 300 (refer to FIGS. 9 and 10). The base body movement device 300 moves the base body S (dye-deposited base body) on which ink is printed by the printing device 100 from the printing position by the printing device 100 to the conveyance device 10 side. In addition, the base body delivery device 200 delivers the base body S on which the ink is printed from the base body movement device 300 to the base body placing device 400. The base body placing device 400 places the base body S at a predetermined position (base body placing unit 85) of the lens L on the dyeing tray 80 in a state where the surface on which the dye (ink) is printed of the base body S faces the lens L (refer to FIGS. 2 and 3) placed on the dyeing tray 80. The details of each part will be described below.

(Conveyance Device)

The conveyance device 10 will be described with reference to FIG. 4. The conveyance device 10 is provided with a pair of rails 11 extending in the conveyance direction. A rotating belt 12 disposed along the rail 11 is provided in the vicinity of the rail 11. The rotating belt 12 is connected to a conveyance motor (for example, step motor) 13. By driving the conveyance motor 13, the rotating belt 12 rotates. When the rotating belt 12 rotates, the dyeing tray 80 moves along the rail 11 in the conveyance direction.

The conveyance device 10 is provided with a plurality of tray positioning units 14. The tray positioning unit 14 is provided at a predetermined position on the conveyance path between the pair of rails 11. When the tray positioning unit 14 is moved upward by a vertical movement actuator (not illustrated), the tray positioning unit 14 comes into contact with the dyeing tray 80 conveyed along the conveyance path, and the conveyance of the dyeing tray 80 is stopped at a predetermined position. Therefore, the conveyance device 10 of the present embodiment can accurately stop the dyeing tray at the predetermined position on the conveyance path. Furthermore, sensors (not illustrated) for detecting the presence or absence of the dyeing tray 80 are provided at a plurality of positions of the rail 11. The control device 70 can detect the position on the dyeing tray 80 conveyed by the conveyance device 10 based on the detection results of each of the plurality of sensors.

The conveyance device 10 of the present embodiment conveys the dyeing tray 80 from the upper left side to the lower right side in FIG. 4. The transfer device 40, the dye fixing device 50, and the like (refer to FIG. 1) are disposed on the downstream side (lower right side in FIG. 4) of the conveyance path illustrated in FIG. 4 of the conveyance paths of the conveyance device 10. The dye-deposited base body manufacturing apparatus 30 places the base body (dye-deposited base body) S on which the ink is printed by the printing device 100 on the dyeing tray 80 by the base body placing device 400. Thereafter, the dyeing tray 80 is conveyed to the transfer device 40 by the conveyance device 10. The positional relationship between the printing device 100 and the conveyance device 10 will be described later.

(Printing Device)

Figure 6:
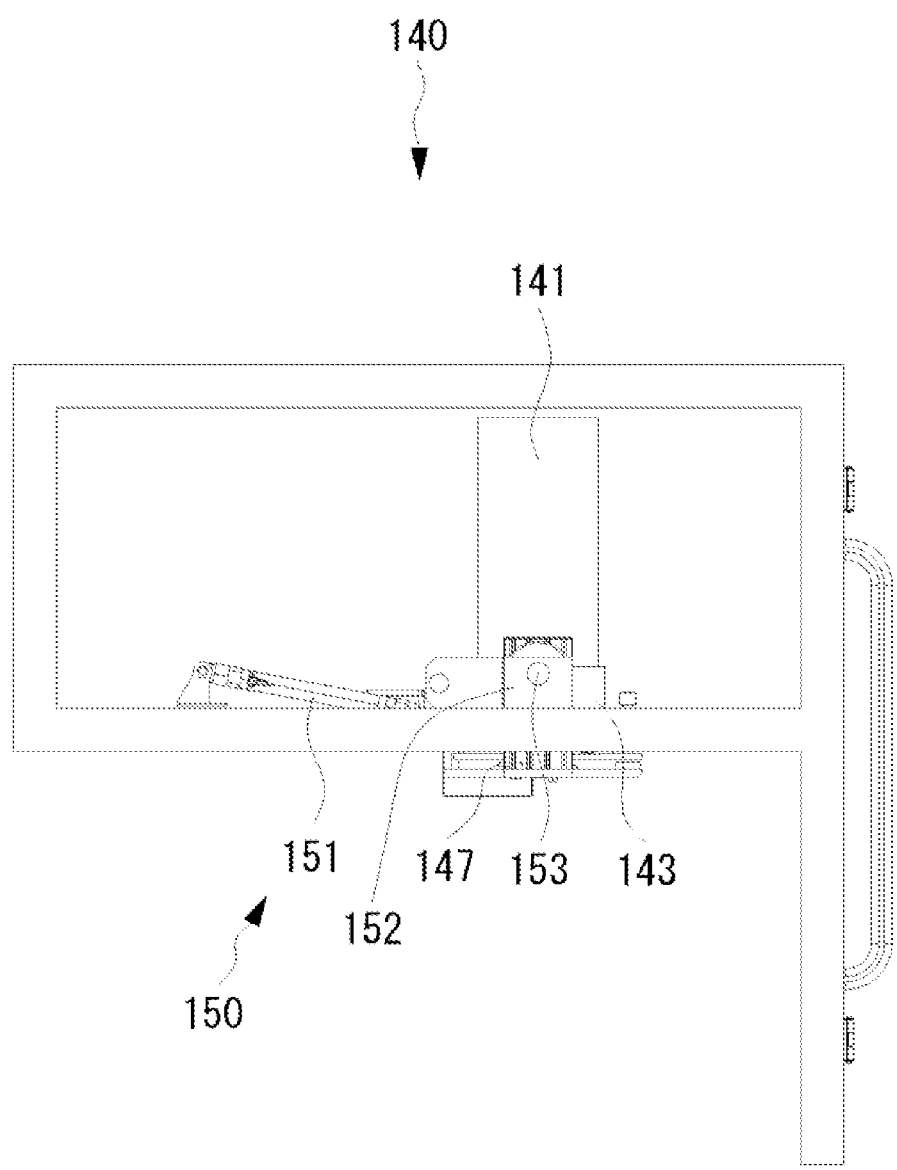
FIG. 6 is a left side view of the cartridge mount unit 140 and the ink stir unit 150 in the used state.
Figure 7:
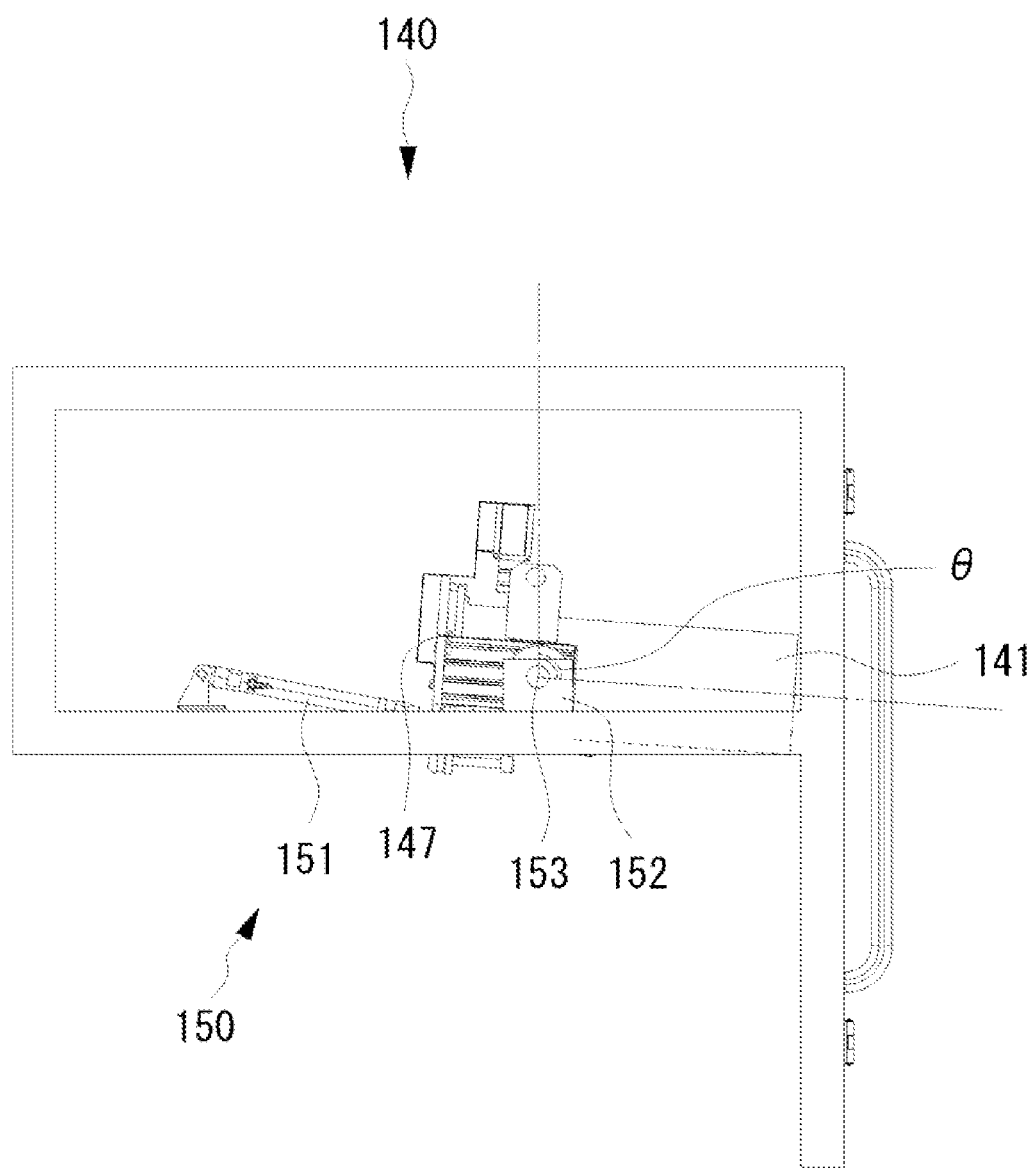
FIG. 7 is a left side view of the cartridge mount unit 140 and the ink stir unit 150 in an inclined state.

The printing device 100 will be described with reference to FIGS. 4 to 7. The printing device 100 of the present embodiment is an ink jet printer capable of printing an ink containing a dye (specifically, sublimation dye) on the base body S. As illustrated in FIG. 4, the printing device 100 is provided with an ink jet head 110, a carriage 120, an operation unit 130, and a cartridge mount unit 140. In addition, as illustrated in FIGS. 5 to 7, the printing device 100 is provided with an ink stir unit 150.

As illustrated in FIG. 4, the ink jet head 110 is provided inside the printing device 100. The ink jet head 110 ejects ink. Specifically, the ink jet head 110 is provided with a plurality (8 pieces in the present embodiment) of ink ejection units. Each of the ink ejection unit ejects ink supplied from each of a plurality (8 pieces in the present embodiment) of cartridges 141 (refer to FIGS. 5 to 7) mounted on the cartridge mount unit 140 downward toward the base body S.

The carriage 120 moves the ink jet head 110 with respect to the base body S in the main scanning direction MD. The control unit (controller 71 in the present embodiment) of the dye-deposited base body manufacturing apparatus 30 controls the drive of the main scanning motor (not illustrated) included in the carriage 120 to move the ink jet head 110 in the main scanning direction MD. The controller 71 prints ink on the two-dimensional region of the base body S by controlling the ejection of ink from the ink jet head 110 while controlling the relative main scanning and sub-scanning of the base body S and the ink jet head 110. A method of sub-scanning in the present embodiment will be described later.

The operation unit 130 is disposed facing the front side (upper right side in FIG. 4) of the printing device. In other words, the operation unit 130 is disposed so that the operator can operate the operation unit 130 from the front side of the printing device 100. The operation unit 130 is operated by the operator during maintenance on the printing device 100. That is, an operation instruction for performing maintenance is input to the operation unit 130 facing the front side. The operation unit 130 of the present embodiment is an operation panel capable of inputting a plurality of types of operation instructions, and is provided with, for example, at least one of a plurality of buttons and a touch panel. When the operation unit 130 is operated by the operator, various operation instructions are input to the printing device 100. Therefore, the operator operates the operation unit 130 from the front side of the printing device 100 in a case of performing maintenance on the printing device 100 or the like. The operation unit 130 of the present embodiment is disposed on the front surface of the housing of the printing device 100. However, the operation unit may be disposed so as to face the front surface on a surface (for example, upper surface) different from the front surface of the housing.

Here, the conveyance device 10 for conveying the dyeing tray 80 is disposed on the side opposite to the front side of the printing device 100 (that is, rear side of the printing device 100). Therefore, unlike the case where the conveyance device 10 is disposed on the front side of the printing device 100 (that is, the side facing the operation unit 130), when the operator operates the operation unit 130, the conveyance device 10 is unlikely to interfere with the operation. Therefore, the operator can easily perform maintenance on the printing device 100 from the front side of the printing device 100. In addition, since it is not necessary to form a space for the operator to perform maintenance in the vicinity of the conveyance device 10, it is easy to reduce the space for installing the device. Since it is not necessary to bypass the conveyance path of the conveyance device 10 in order to secure a space for performing maintenance, it is possible to prevent the conveyance path from being long.

The cartridge mount unit 140 of the present embodiment will be described in detail with reference to FIGS. 5 to 7. The cartridge mount unit 140 mounts a cartridge 141 containing ink supplied to the ink jet head 110. The cartridge 141 of the present embodiment is configured by disposing a bag (aluminum pouch) filled with ink inside a housing having appropriate rigidity. As illustrated in FIG. 5, the cartridge mount unit 140 is provided with a plurality (8 pieces in the present embodiment) of insertion units 143 and linear motion guides 145. The cartridge 141 is inserted into each of the insertion unit 143. That is, the cartridge mount unit 140 of the present embodiment can mount a plurality of cartridges 141. In the present embodiment, the cartridge 141 is mounted on the cartridge mount unit 140 by inserting the cartridge 141 into the tubular insertion unit 143. In addition, a guide piece 144 having a guide hole through which the linear motion guide 145 is inserted is fixed to the insertion unit 143.

The linear motion guide 145 restricts (guides) the movable direction of the insertion unit 143 into which the cartridge 141 is inserted in the one-dimensional direction. Specifically, the linear motion guide 145 of the present embodiment restricts the movable direction of the insertion unit 143 to the vertical direction (up and down direction) in the used state (state illustrated in FIG. 6) when the ink is printed by the printing device 100. In the present embodiment, the movable direction of the insertion unit 143 (cartridge 141) is restricted to the vertical direction by inserting the guide hole of the guide piece 144 fixed to the insertion unit 143 into the linear motion guide 145 extending in the vertical direction in the used state.

As illustrated in FIGS. 6 and 7, the cartridge mount unit 140 is provided with a plurality (8 pieces in the present embodiment) of weight sensors 147. Each of the weight sensors 147 measures the weight of each of the plurality of cartridges 141 mounted on the cartridge mount unit 140 during the used state. As illustrated in FIG. 6, each of the plurality of weight sensors 147 in the present embodiment is provided at a position where the weight sensor 147 comes into contact with the bottom portion of the insertion unit 143 during the used state. Therefore, during the used state, the total value of the weight of the insertion unit 143 and the weight of the cartridge 141 mounted on the insertion unit 143 is measured by the weight sensor 147.

In the present embodiment, the weight obtained by subtracting the weight of the insertion unit 143 and the weight of the housing of the cartridge 141 from the weight measured by the weight sensor 147 is close to the weight of the ink remaining inside the housing of the cartridge 141. Therefore, the controller 71 can generate remaining ink amount information about the remaining amount of ink in the cartridge 141 based on the weight measured during the used state by the weight sensor 147. For example, the dye-deposited base body manufacturing apparatus 30 may store the weight measured by the weight sensor 147 in the database 72 as an offset value in a state where the cartridge 141 completely empty of ink is mounted on the insertion unit 143. The controller 71 may generate remaining ink amount information based on the weight measured by the weight sensor 147 and the offset value.

As described above, the movable direction of the insertion unit 143 in the used state is restricted to the vertical direction by the linear motion guide 145. As a result, the measurement accuracy of the weight of the cartridge 141 (specifically, total weight of the cartridge 141 and the insertion unit 143) by the weight sensor 147 is improved.

In addition, in the present embodiment, each of the insertion units 143 is provided with a needle, a tube, and a solenoid valve. When the cartridge 141 is mounted to the insertion unit 143, the needle penetrates a rubber stopper of an aluminum pouch in the cartridge 141. As a result, the ink in the cartridge 141 is supplied to the ink jet head 110 via the needle and tube. In addition, the solenoid valve can control the flow of ink in the tube by switching between compression and release of the tube. For example, the controller 71 can reduce the possibility of air entering the tube by stopping the flow of ink in the tube by the solenoid valve when the cartridge 141 is replaced.

The ink stir unit 150 of the present embodiment will be described with reference to FIGS. 5 to 7. The ink stir unit 150 stirs the ink in the cartridge 141 in a case where the cartridge 141 is mounted on the cartridge mount unit 140. Therefore, even when the operator does not manually stir the ink, the ink in the cartridge 141 is automatically stirred by the ink stir unit 150 and supplied to the ink jet head 110. Therefore, the ink is appropriately printed on the base body S regardless of the property that a difference in the concentration of the ink containing the dye is likely to occur.

The ink stir unit 150 of the present embodiment causes the cartridge 141 mounted on the cartridge mount unit 140 to include from a used state (state illustrated in FIG. 6) when printing (that is, when supplying ink to the ink jet head 110) to a inclined state (state illustrated in FIG. 7). Thereafter, the ink stir unit 150 returns the cartridge 141 from the inclined state to the used state. As a result, the ink in the cartridge 141 is appropriately stirred without inserting any member into the inside of the cartridge 141.

Specifically, the ink stir unit 150 is provided with an actuator (solenoid in the present embodiment) 151 and a rotation support unit 152. The rotation support unit 152 rotatably supports the cartridge mount unit 140 including the plurality of insertion units 143 around the rotation shaft 153. An operating unit of the actuator 151 (in the present embodiment, operating shaft of the solenoid) is connected to a position of the rotation support unit 152 deviated from the rotation shaft 153 (in the present embodiment, below the rotation shaft 153 in FIG. 6). Therefore, when the actuator 151 is operated, the cartridge 141 mounted on the cartridge mount unit 140 rotates about the rotation shaft 153 between a position used for printing (refer to FIG. 6) and a position inclined for stirring ink (refer to FIG. 7). Specifically, when the actuator 151 pushes out the operating shaft, the cartridge 141 is in a used state (refer to FIG. 6), and when the actuator 151 pulls in the operating shaft, the cartridge 141 is in an inclined state (refer to FIG. 7). Therefore, the ink in the cartridge 141 is appropriately stirred.

As described above, the cartridge mount unit 140 can mount the plurality of cartridges 141. The ink stir unit 150 can simultaneously stir the ink of the plurality of cartridges 141 by operating one actuator 151 and inclining the entire cartridge mount unit 140 on which the plurality of cartridges 141 are mounted. Therefore, the ink of the plurality of cartridges 141 is stirred more efficiently.

The controller 71 (control unit of the dye-deposited base body manufacturing apparatus 30 in the present embodiment) stirs the ink in the cartridge 141 by the ink stir unit 150 after the power is provided to the printing device 100 and before printing is performed by the printing device 100. In other words, the controller 71 of the present embodiment stirs the ink when the power is provided to the printing device 100. Therefore, the ink in the cartridge 141 in which the concentration of the dye is non-uniform while the power to the printing device 100 is shut off is automatically stirred by the ink stir unit 150, and then printing by the printing device 100 is performed.

In addition, the controller 71 stirs the ink in the cartridge 141 by the ink stir unit 150 in a case where a predetermined time or more has elapsed after the last stirring of the ink. Therefore, since the ink in the cartridge 141 is periodically stirred, the lens L is appropriately dyed. The controller 71 periodically stirs the ink every time the time after the last stirring of the ink reaches a predetermined time. However, the controller 71 may stir the ink in a case where a predetermined time or more has elapsed after the last stirring of the ink and a printing start instruction is input to the printing device 100.

In addition, the controller 71 stirs the ink in the cartridge 141 while the printing by the printing device 100 is not performed. Therefore, during printing, the ink already stirred is supplied to the ink jet head 110, so that the dyeing quality is improved. In addition, defects such as ink clogging are unlikely to occur.

The controller 71 controls the ink stirring operation in the cartridge 141 by the ink stir unit 150 based on the weight of the cartridge 141 measured by the weight sensor 147. Therefore, an appropriate stirring operation is performed depending on the weight of the ink remaining in the cartridge 141. For example, the controller 71 may change the interval of time for stirring the ink by the ink stir unit 150 based on the weight measured by the weight sensor 147. In addition, the controller 71 may change the number of times the ink is stirred by the ink stir unit 150 or the like based on the weight measured by the weight sensor 147.

As described above, the controller 71 generates remaining ink amount information about the remaining amount of ink in the cartridge 141 based on the weight measured by the weight sensor 147. Therefore, information about the remaining amount of ink is generated with higher accuracy than in the case of estimating the remaining amount using the number of times the ink is ejected. Specifically, in the present embodiment, the controller 71 notifies the operator of the information of the remaining amount of ink estimated based on the weight measured by the weight sensor 147 by display on the display unit (not illustrated), voice, or the like. In addition, in a case where the remaining amount of ink estimated based on the weight measured by the weight sensor 147 is the first threshold value or less, the controller 71 executes a replacement recommendation operation for recommending the replacement of the cartridge 141 to the operator. Furthermore, the controller 71 executes a printing stop operation of stopping printing until the cartridge 141 is replaced in a case where the estimated remaining amount of ink is equal to or less than the second threshold value smaller than the first threshold value. The output method of the remaining ink amount information described in the present embodiment is merely an example. That is, as a matter of course, it is possible to change the output method of the remaining ink amount information.

As illustrated in FIG. 7, in the ink stir unit 150 of the present embodiment, the rotation angle θ of the cartridge 141 in the inclined state with respect to the cartridge 141 in the used state is set to 90 degrees or more. Specifically, in the present embodiment, the rotation angle θ is set to an angle larger than 90 degrees (for example, 93 degrees to 95 degrees). Therefore, while the cartridge 141 is in the inclined state, the weight from the cartridge 141 to the weight sensor 147 is zero. The controller 71 executes the zero point adjustment of the weight sensor 147 while the cartridge 141 is inclined (that is, in a state where the cartridge 141 is inclined by 90 degrees or more from the used state by the ink stir unit 150). Therefore, the accuracy of weight measurement by the weight sensor 147 is appropriately improved.

(Base Body Delivery Device)

Figure 8:
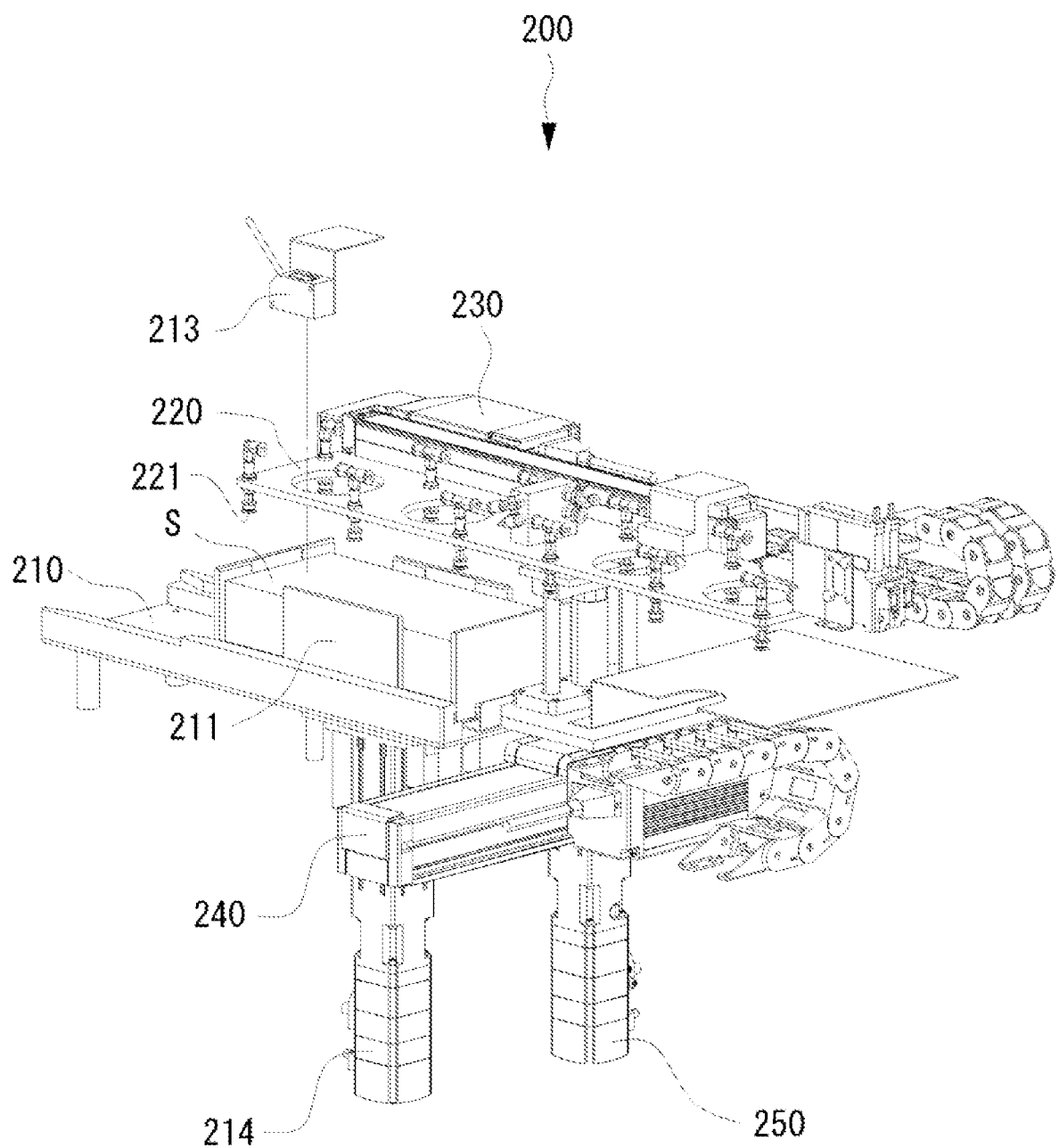
FIG. 8 is a perspective view of a base body delivery device 200 when viewed from diagonally rear left.

The base body delivery device 200 will be described with reference to FIG. 8. As described above, the base body delivery device 200 delivers the base body S on which ink is not printed from the base body stock unit 210 to the base body movement device 300 (refer to FIGS. 9 and 10). In addition, the base body delivery device 200 delivers the base body S on which the ink is printed from the base body movement device 300 to the base body placing device 400 (refer to FIGS. 11 and 12).

The base body S on which ink is not printed is laminated and stocked on the base body stock unit 210. In the present embodiment, the cassette 211 having the plurality of laminated base bodys S is mounted on the base body stock unit 210 by the operator, so that the base body S is stocked in the base body stock unit 210.

A distance measuring sensor 213 is provided above the base body stock unit 210. The distance measuring sensor 213 detects the position (height) of the uppermost base body S among the base bodys S stocked in the base body stock unit 210. In addition, the dye-deposited base body manufacturing apparatus 30 is provided with a lifting and lowering device 214. The lifting and lowering device 214 lifts and lowers (moves up and down) the base body stock unit 210. In the present embodiment, the controller 71 controls the drive of the lifting and lowering device 214 so that the position (height) of the uppermost base body S detected by the distance measuring sensor 213 is a predetermined position. Therefore, the base body delivery device 200 can stably receive the uppermost base body S of the base body stock unit 210.

The base body delivery device 200 is provided with a suction holding unit 220, a first slider 230, a second slider 240, and a lifting and lowering device 250. The suction holding unit 220 holds the base body S by utilizing the suction of gas. In the present embodiment, the main body of the suction holding unit 220 is a plate-shaped member in which a plurality of circular holes are formed. The suction holding unit 220 is provided with a plurality of suction ports 221. The plurality of suction ports 221 face downward from the main body of the suction holding unit 220 and are connected to an ejector (not illustrated) for sucking gas. The ejector uses the Venturi effect to generate negative pressure. A pump or the like may be used instead of the ejector. The first slider 230 moves the suction holding unit 220 in the first direction (in the present embodiment, the left-right direction in the dye-deposited base body manufacturing apparatus 30). The second slider 240 moves the suction holding unit 220 in the direction horizontally intersecting with the first direction (in the present embodiment, the front-rear direction in the dye-deposited base body manufacturing apparatus 30). In addition, the lifting and lowering device 250 lifts and lowers (moves up and down) the suction holding unit 220.

The controller 71 controls the drive of the first slider 230 and the second slider 240, and lowers the suction holding unit 220 by a predetermined distance by the lifting and lowering device 250 in a state where the suction holding unit 220 is positioned above the base body stock unit 210. As a result, the plurality of suction ports 221 in the suction holding unit 220 come into contact with the uppermost base body S of the base body stock unit 210. Next, the controller 71 causes the suction holding unit 220 to hold the base body S by sucking gas from the suction port 221 by an ejector (not illustrated). Next, the controller 71 controls the drive of the first slider 230, the second slider 240, and the lifting and lowering device 250 to move the base body S to a predetermined position of the base body movement device 300 (refer to FIGS. 9 and 10). Specifically, the suction holding unit 220 is disposed at a position higher than the base body support unit 330 of the base body movement device 300. The controller 71 moves the suction holding unit 220 in a state of holding the base body S above (vertically upward) the base body support unit 330 of the base body movement device 300. Thereafter, the controller 71 delivers the base body S to the base body support unit 330 of the base body movement device 300 by releasing the suction of the gas from the suction port 221.

Figure 9:
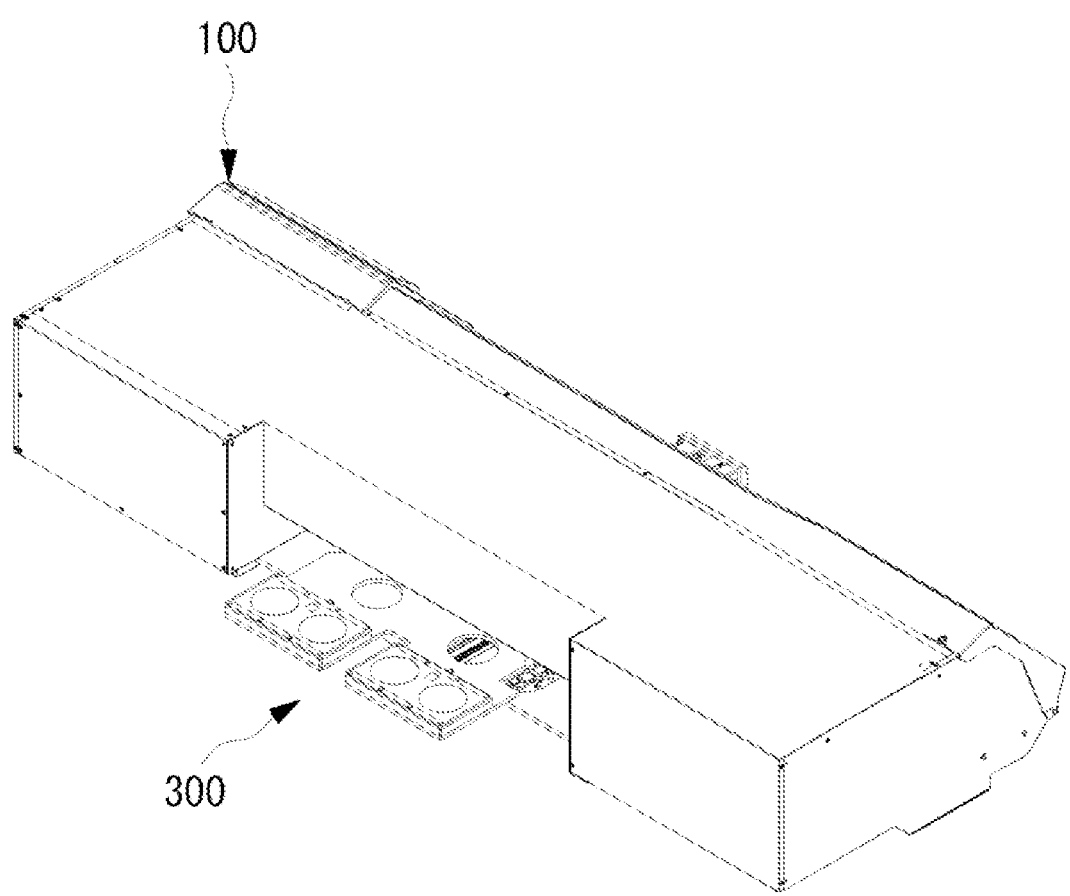
FIG. 9 is a perspective view of a printing device 100 and a base body movement device 300 when viewed from diagonally rear left.
Figure 10:
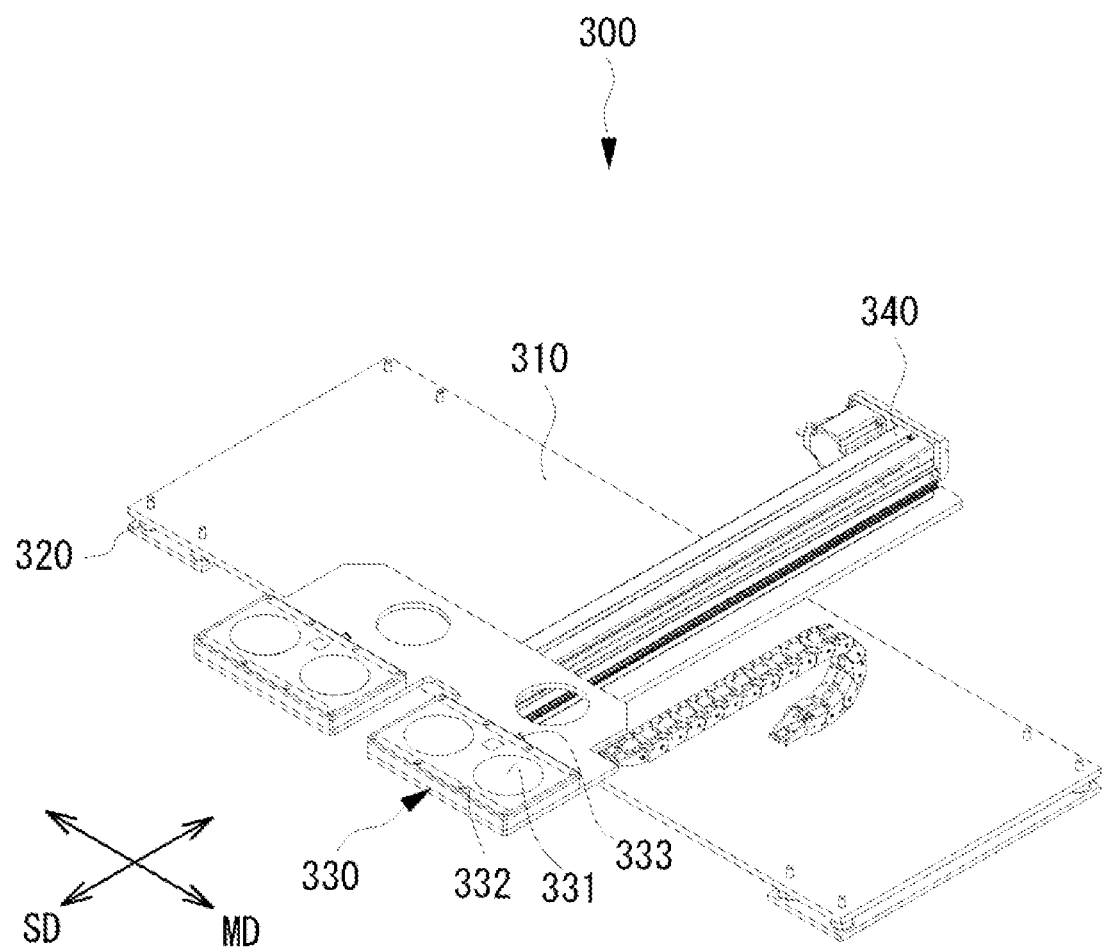
FIG. 10 is a perspective view of the base body movement device 300 when viewed from diagonally rear left.

In addition, the controller 71 controls the drive of the first slider 230 and the second slider 240, and lowers the suction holding unit 220 by a predetermined distance by the lifting and lowering device 250 in a state where the suction holding unit 220 is positioned above the base body support unit 330 (refer to FIGS. 9 and 10). As a result, the plurality of suction ports 221 in the suction holding unit 220 come into contact with the base body S on the base body support unit 330. Next, the controller 71 causes the suction holding unit 220 to hold the base body S by sucking gas from the suction port 221 by an ejector (not illustrated). Next, the controller 71 controls the drive of the first slider 230, the second slider 240, and the lifting and lowering device 250 to move the suction holding unit 220 in a state of holding the base body S above the base body holding unit 410 of the base body placing device 400. Thereafter, the controller 71 delivers the base body S to the base body placing device 400 by releasing the suction of the gas from the suction port 221.

(Base Body Movement Device)

The base body movement device 300 will be described with reference to FIGS. 9 and 10. As illustrated in FIG. 9, the base body movement device 300 can move the base body S from a position (printing position) where printing is performed by the ink jet head 110 (refer to FIG. 4) inside the printing device 100 to the conveyance device 10 (refer to FIG. 4) side disposed outside the printing device 100. As described above, the conveyance device 10 of the present embodiment is disposed on the rear side (lower left side of the paper surface in FIG. 9) of the printing device 100. Therefore, the base body movement device 300 moves the base body S from the printing position inside the printing device 100 to the rear side of the printing device 100.

As illustrated in FIG. 10, the base body movement device 300 of the present embodiment is provided with a base unit 310, an oscillation absorbing material 320, a base body support unit 330, and a slider 340. The base unit 310 is a plate-shaped member that serves as a base supporting the entire base body movement device 300 including the base body support unit 330. The base unit 310 is fixed to the printing device 100 (refer to FIG. 4) via the oscillation absorbing material (for example, seismic isolation rubber or the like) 320. The oscillation absorbing material 320 absorbs oscillation. In the present embodiment, the oscillation absorbing materials 320 are disposed at a plurality of locations so that the positions of the centers of gravity of a plurality of oscillation absorbing materials 320 and the position of the center of gravity of the printing device 100 coincide with each other in a plan view.

The base body support unit 330 supports the base body S from below. In the base body movement device 300 of the present embodiment, the two base body support units 330 are provided side by side in the left-right direction (direction along the main scanning direction MD of the printing device 100). However, the number of the base body support units 330 included in the base body movement device 300 may be one or three or more.

The base body support unit 330 of the present embodiment is provided with a support surface 331, a suction hole 332, and a pump connection unit 333. The base body S is placed on the support surface 331. The support surface 331 of the present embodiment is a flat surface disposed horizontally. In addition, the support surface 331 of the present embodiment is formed in a shape slightly larger than the shape of the rectangular base body S. Therefore, the sheet-shaped base body S is difficult to separate from the support surface 331. The suction hole 332 is formed on the support surface 331 of the base body support unit 330. The suction hole 332 is connected to a pump (not illustrated) that sucks gas via the pump connection unit 333. By controlling the drive of the pump and sucking the gas from the suction hole 332, the controller 71 can adsorb the base body S on the support surface 331 of the base body support unit 330. Therefore, the base body S is appropriately supported by the support surface 331 in a state where the occurrence of damage and deformation of the base body S is suppressed.

Specifically, a plurality (8 pieces in the present embodiment) of suction holes 332 of the present embodiment are provided along at least the outer peripheral portion of the support surface 331 of the base body support unit 330. As a result, the sheet-shaped base body S is sucked by the suction holes 332 at a plurality of locations on the outer peripheral portion. Therefore, the base body S is more appropriately supported by the base body support unit 330.

In addition, as described above, the base body S of the present embodiment includes a metal layer and is flexible. In a case where the flexible base body S including the metal layer is moved by the pinch roller, the base body S may be bent by the stress of the force applied from the pinch roller to the base body S. On the other hand, the base body movement device 300 of the present embodiment can appropriately suppress the bending of the base body S during movement by moving the base body support unit 330 in a state where the base body adsorbed on the support surface 331 of the base body support unit 330.

The slider 340 moves the base body support unit 330 in one-dimensional direction. Specifically, the slider 340 of the present embodiment can move the base body S supported by the base body support unit 330 from the printing position to the conveyance device 10 side by moving the base body support unit 330 in the front-rear direction in the dye-deposited base body manufacturing apparatus 30.

In addition, in the present embodiment, the front-rear direction in the dye-deposited base body manufacturing apparatus 30 coincides with the sub-scanning direction SD of the printing device 100. The base body movement device 300 of the present embodiment moves the base body S to the sub-scanning direction SD that intersects (orthogonal in the present embodiment) the main scanning direction MD by the carriage 120 (refer to FIG. 4) during printing of the ink by the printing device 100. That is, the base body movement device 300 of the present embodiment also serves as a sub-scanning device that moves the base body S in the sub-scanning direction SD during printing by the printing device 100. Therefore, both the sub-scanning during printing and the movement of the base body S from the printing position are appropriately executed by the base body movement device 300 in a state where the device configuration is suppressed from being complicated.

When the base body movement device 300 moves the base body S supported by the base body support unit 330 to the side closest to the conveyance device 10, the base body S is adjacent to the base body placing device 400 (refer to FIGS. 11 and 12). The base body movement device 300 moves the base body S on which the ink is printed from the printing position to the conveyance device 10 side to deliver the base body S to the base body placing device 400. Therefore, the base body S on which the ink is printed by the printing device 100 is automatically conveyed by the base body movement device 300, the base body placing device 400, and the conveyance device 10 in this order. Therefore, the burden on the operator is further reduced.

(Base Body Placing Device)

The base body placing device 400 will be described with reference to FIGS. 11 and 12. As described above, the base body placing device 400 places the base body S at a predetermined position of the lens L on the dyeing tray 80 (in the present embodiment, base body placing unit 85 above the lens L) in a state where the surface on which the dye (ink) is printed of the base body S faces the lens L (refer to FIGS. 2 and 3) placed on the dyeing tray 80. Therefore, even when the operator does not manually place the base body S on the dyeing tray 80, the base body S is automatically and appropriately placed at an appropriate position on the dyeing tray 80. As described above, FIGS. 11 and 12 are views viewed from diagonally front right (direction of arrow F in FIG. 4) of the device. The base body placing device 400 of the present embodiment is provided with a base body holding unit 410, an upside-down turning unit 430, and a heating unit 450.

The base body holding unit 410 holds the base body S in a state where the base body holding unit 410 is in contact with the reverse surface of the printing surface on which the dye (ink) is printed among a pair of surfaces of the sheet-shaped base body S. Therefore, the bending, folding, breakage, and the like of the base body S are unlikely to occur as compared with the case where one end portion of the base body S is held. In the base body placing device 400 of the present embodiment, the two base body holding units 410 are provided side by side in the left-right direction (direction along the main scanning direction MD of the printing device 100). However, the number of the base body holding units 410 included in the base body placing device 400 may be one or three or more.

Specifically, as illustrated in FIG. 11, a ventilation unit 411 is formed in the base body holding unit 410 at a position of the base body S in contact with the reverse surface of the printing surface. The ventilation unit 411 allows the gas to pass between the ventilation unit 411 and an air flow control device (for example, a pump or the like, not illustrated) capable of switching between suction and discharge of the gas. In the present embodiment, the ventilation unit 411 formed on the surface (contact surface in contact with the base body S) of the base body holding unit 410 is connected to the air flow control device through the flow path inside the base body holding unit 410.

The contact surface in contact with the reverse surface of the base body S of the base body holding unit 410 is a flat surface. Therefore, the sheet-shaped base body S is held in contact with the flat contact surface of the base body holding unit 410. As a result, the possibility that the base body S is bent, folded, or the like is further reduced.

In the present embodiment, the ventilation unit 411 includes a groove unit formed on the contact surface in contact with the base body S of the base body holding unit 410. The shape (annular shape) of the groove unit corresponds to the print shape (circular in the present embodiment) of the dye printed on the printing surface of the base body S by the printing device 100. Therefore, the groove unit is located on the reverse surface of the printing region of the dye on the base body S, so that the printing region of the dye is more firmly held by the base body holding unit 410.

In other words, in the present embodiment, the ventilation unit 411 includes an annular groove unit formed on the contact surface in contact with the base body S of the base body holding unit 410. In addition, as described above, the resin body dyed by the dyeing system 1 of the present embodiment is a substantially disk-shaped lens (spectacle lens) L. The ink containing the dye is printed in a circle on the printing surface of the base body S. The ventilation unit 411 including the annular groove unit is located on the reverse surface of the dye printed in a circle with respect to the base body S. As a result, the circular portion on which the dye is printed is more firmly held by the base body holding unit 410. Therefore, it is more appropriately suppressed that the portion on which the dye is printed is folded or the like.

A plurality of circular groove units included in the ventilation unit 411 are formed concentrically. Therefore, the base body S is more firmly held by the base body holding unit 410 as compared with the case where there is only one circular groove unit.

The upside-down turning unit 430 turns the base body holding unit 410 that holds the base body S upside down. Specifically, the upside-down turning unit 430 of the present embodiment is provided with a rotation shaft 431 and actuators (air cylinder in the present embodiment) 432 and 433. The rotation shaft 431 is disposed in the horizontal direction and is fixed to the base body holding unit 410. The operating unit of the actuators 432 and 433 (in the present embodiment, operating shaft of the air cylinder) is connected to a part of the base body holding unit 410.

As illustrated in FIGS. 11 and 12, when the actuators 432 and 433 are operated, the base body holding unit 410 fixed to the rotation shaft 431 rotates 180 degrees around the rotation shaft 431. As a result, the base body holding unit 410 is turned upside down. Furthermore, when the base body holding unit 410 is rotated from the state illustrated in FIG. 11 to the state illustrated in FIG. 12 by the upside-down turning unit 430, the base body holding unit 410 moves above the dyeing tray 80 on the conveyance device 10. That is, the upside-down turning unit 430 also serves as a function of turning the base body S held by the base body holding unit 410 upside down and a function of moving the base body S above the dyeing tray 80.

As illustrated in FIG. 11, the placing positioning unit 413 is provided at a predetermined position of the base body holding unit 410. The placing positioning unit 413 of the present embodiment is a plurality of recessed portions. When the base body holding unit 410 is turned upside down by the upside-down turning unit 430, the plurality of placing positioning units 413 provided on the base body holding unit 410 are fitted into the plurality of projection units (tray fitting units) 84 in the dyeing tray 80. As a result, the relative position of the base body holding unit 410 with respect to the dyeing tray 80 is fixed at a predetermined position. Therefore, the base body placing device 400 can more accurately place the base body S on the base body placing unit 85 of the dyeing tray 80.

The heating unit 450 heats the base body holding unit 410 to dry the ink printed on the base body S held by the base body holding unit 410. Therefore, the base body placing device 400 has a function of drying the ink printed on the base body S in addition to the function of placing the base body S on the dyeing tray 80. Specifically, the heating unit 450 is made of a substance having high thermal conductivity and is disposed at a position adjacent to the base body holding unit 410 (in the present embodiment, position adjacent below the base body holding unit 410). The heating unit 450 is provided with a heater mount unit 451 on which a heater (not illustrated) is mounted. The heating unit 450 is heated by driving the heater mounted on the heater mount unit 451. As a result, the base body holding unit 410 adjacent to the heating unit 450 is heated.

As described above, the ventilation unit 411 including the annular groove unit is located on the reverse surface of the dye (ink) printed in a circle with respect to the base body S. Therefore, the circular portion of the base body S on which the ink is printed comes into contact with the base body holding unit 410 more firmly. Therefore, heat is easily conducted from the base body holding unit 410 to the ink, so that the ink is dried more appropriately.

A radiant heat reflecting plate 453 is provided on the side surface and the bottom surface of the heating unit 450. A gap is provided between the radiant heat reflecting plate 453 and the heating unit 450. In addition, the surface of the radiant heat reflecting plate 453 facing the heating unit 450 is formed in a mirror surface shape so as to easily reflect the radiant heat from the heating unit 450. Therefore, it is appropriately suppressed by the radiant heat reflecting plate 453 that the radiant heat from the heating unit 450 is transmitted to the side and the lower side of the heating unit 450.

The controller 71 sucks the gas from the ventilation unit 411 by the air flow control device to hold the base body S in the base body holding unit 410. In addition, the suction of gas from the ventilation unit 411 by the air flow control device is released in a state where the base body holding unit 410 is turned upside down by the upside-down turning unit, so that the controller 71 places the base body S held by the base body holding unit 410 at a predetermined position on the dyeing tray 80. Therefore, the base body placing device 400 can appropriately hold and place the base body S while suppressing the occurrence of damage to the base body S by utilizing the suction of gas.

In addition, gas from the ventilation unit 411 by the air flow control device is discharged in a state where the base body holding unit 410 is turned upside down by the upside-down turning unit, so that the controller 71 places the base body S held by the base body holding unit 410 at a predetermined position on the dyeing tray 80. Therefore, even when the base body S is difficult to be separated from the base body holding unit 410 due to the influence of static electricity generated between the base body holding unit 410 and the base body, the base body S is likely to be appropriately separated from the base body holding unit 410 by the gas discharged from the ventilation unit 411.

The techniques disclosed in the above embodiments are merely examples. Therefore, it is possible to modify the techniques exemplified in the above embodiments. For example, only a part of the plurality of techniques exemplified in the above embodiments may be adopted.

(A1) According to a first aspect of the present disclosure, there is provided a dye-deposited base body manufacturing apparatus including:

a printing device that prints a dye on a base body; and a base body placing device that places a dye-deposited base body on which the dye is printed by the printing device at a predetermined position of a resin body on a dyeing tray in a state where a surface on which the dye is printed by the printing device of the dye-deposited base body faces the resin body placed on the dyeing tray, in which the dye-deposited base body manufacturing apparatus manufactures the dye-deposited base body to which the dye to be transferred to the resin body is deposited, used in a dyeing step of dyeing the resin body.

(A2) In the dye-deposited base body manufacturing apparatus according to the first aspect, the dye-deposited base body manufacturing apparatus according to the above (A1), in which the base body placing device includes a base body holding unit that holds the base body in a state where the base body holding unit is in contact with a reverse surface opposite to a printing surface on which the dye is printed among a pair of surfaces of the base body.

(A3) In the dye-deposited base body manufacturing apparatus according to the first aspect, the dye-deposited base body manufacturing apparatus according to the above (A2), in which the base body placing device further includes a ventilation unit formed at a position of the base body holding unit in contact with the reverse surface of the base body and allowing gas to pass therethrough, the base body placing device causes the base body holding unit to hold the base body by sucking gas from the ventilation unit, and the base body placing device places the base body held by the base body holding unit at the predetermined position on the dyeing tray by releasing suction of gas from the ventilation unit.

(A4) In the dye-deposited base body manufacturing apparatus according to the first aspect, the dye-deposited base body manufacturing apparatus according to the above (A3), in which the base body placing device places the base body held by the base body holding unit at the predetermined position on the dyeing tray by discharging gas from the ventilation unit.

(A5) In the dye-deposited base body manufacturing apparatus according to the first aspect, the dye-deposited base body manufacturing apparatus according to any one of above (A2) to (A4), in which a contact surface of the base body holding unit in contact with the reverse surface of the base body is a flat surface.

(A6) In the dye-deposited base body manufacturing apparatus according to the first aspect, the dye-deposited base body manufacturing apparatus according to the above (A5), in which the ventilation unit includes a groove unit formed on the contact surface of the base body holding unit, and a shape of the groove unit corresponds to a printing shape of the dye printed on the printing surface of the base body by the printing device.

(A7) In the dye-deposited base body manufacturing apparatus according to the first aspect, the dye-deposited base body manufacturing apparatus according to the above (A5), in which the resin body to be dyed is a spectacle lens, the dye is printed in a circle on the printing surface of the base body, and the ventilation unit includes an annular groove unit formed on the contact surface of the base body holding unit.

(A8) In the dye-deposited base body manufacturing apparatus according to the first aspect, the dye-deposited base body manufacturing apparatus according to any one of above (A1) to (A7), in which the base body holding unit further includes a placing positioning unit fitted into a tray fitting unit formed at a predetermined position on the dyeing tray, and the base body placing device places the base body at the predetermined position on the dyeing tray in a state where the placing positioning unit is fitted into the tray fitting unit of the dyeing tray.

(A9) In the dye-deposited base body manufacturing apparatus according to the first aspect, the dye-deposited base body manufacturing apparatus according to any one of above (A1) to (A8), in which the base body placing device further includes an upside-down turning unit that turns the base body holding unit upside down, and after holding the base body on an upper part of the base body holding unit, the base body placing device causes the upside-down turning unit to turn the base body holding unit upside down to place the base body at the predetermined position on the dyeing tray.

(A10) According to the first aspect of the present disclosure, there is provided a dyeing system including:

the dye-deposited base body manufacturing apparatus according to any one of above (A1) to (A9);

a transfer device that transfers a dye of a dye-deposited base body, to which the dye is deposited, manufactured by the dye-deposited base body manufacturing apparatus to a resin body; and a dye fixing device that heats the resin body to which the dye is transferred by the transfer device to fix the dye deposited on a surface of the resin body to the resin body.

(B1) According to a second aspect of the present disclosure, there is provided a dye-deposited base body manufacturing apparatus including:

a printing device that prints ink containing a dye on a base body;

a cartridge mount unit on which a cartridge containing the ink supplied to the printing device is mounted; and an ink stir unit that stirs the ink in the cartridge in a state where the cartridge is mounted on the cartridge mount unit, in which the dye-deposited base body manufacturing apparatus manufactures a dye-deposited base body to which the dye to be transferred to a resin body is deposited, used in a dyeing step of dyeing the resin body.

(B2) In the dye-deposited base body manufacturing apparatus according to the second aspect, the dye-deposited base body manufacturing apparatus according to the above (B1), in which the ink stir unit stirs the ink in the cartridge in a case where a predetermined time or more elapses after the last stirring of the ink.

(B3) In the dye-deposited base body manufacturing apparatus according to the second aspect, the dye-deposited base body manufacturing apparatus according to (B1) or (B2), in which the ink stir unit stirs the ink in the cartridge while printing by the printing device is not performed.

(B4) In the dye-deposited base body manufacturing apparatus according to the second aspect, the dye-deposited base body manufacturing apparatus according to any one of above (B1) to (B3), in which the ink stir unit stirs the ink in the cartridge after power is provided to the printing device and before printing is performed by the printing device.

(B5) In the dye-deposited base body manufacturing apparatus according to the second aspect, the dye-deposited base body manufacturing apparatus according to any one of above (B1) to (B4), in which the ink stir unit stirs the ink in the cartridge by inclining the cartridge mounted on the cartridge mount unit from a used state when printing and then returning the cartridge to the used state.

(B6) In the dye-deposited base body manufacturing apparatus according to the second aspect, the dye-deposited base body manufacturing apparatus according to any one of above (B1) to (B5), in which a plurality of the cartridges enable to be mounted on the cartridge mount unit, and the ink stir unit simultaneously stirs the ink in the plurality of cartridges mounted on the cartridge mount unit.

(B7) In the dye-deposited base body manufacturing apparatus according to the second aspect, the dye-deposited base body manufacturing apparatus according to any one of above (B1) to (B6), further including:

a weight sensor that measures a weight of the cartridge mounted on the cartridge mount unit, in which a control unit of the dye-deposited base body manufacturing apparatus generates remaining ink amount information about a remaining amount of the ink in the cartridge based on a weight of the cartridge measured by the weight sensor.

(B8) In the dye-deposited base body manufacturing apparatus according to the second aspect, the dye-deposited base body manufacturing apparatus according to the above (B7), in which the control unit controls an stirring operation of the ink in the cartridge by the ink stir unit based on a weight of the cartridge measured by the weight sensor.

(B9) In the dye-deposited base body manufacturing apparatus according to the second aspect, the dye-deposited base body manufacturing apparatus according to the above (B5), further including:

a weight sensor mounted on the cartridge mount unit that measures the weight of the cartridge in the used state, in which the control unit of the dye-deposited base body manufacturing apparatus adjusts a zero point of the weight sensor in a state where the cartridge is inclined by 90 degrees or more from a used state by the ink stir unit.

(B10) According to the second aspect of the present disclosure, there is provided a dyeing system including:

the dye-deposited base body manufacturing apparatus according to any one of above (BJ) to (B9);

a transfer device that transfers a dye of a dye-deposited base body, to which the dye is deposited, manufactured by the dye-deposited base body manufacturing apparatus to a resin body; and a dye fixing device that heats the resin body to which the dye is transferred by the transfer device to fix the dye deposited on a surface of the resin body to the resin body.

(C1) According to a third aspect of the present disclosure, there is provided a dye-deposited base body manufacturing apparatus including:

a printing device that prints a dye on a base body;

a conveyance device that conveys a dyeing tray on which a resin body is placed; and a base body movement device that moves a dye-deposited base body on which the dye is printed by the printing device from a printing position by the printing device to a side of the conveyance device, in which the dye-deposited base body manufacturing apparatus manufactures the dye-deposited base body to which the dye to be transferred to the resin body is deposited, used in a dyeing step of dyeing the resin body.

(C2) In the dye-deposited base body manufacturing apparatus according to the third aspect, the dye-deposited base body manufacturing apparatus according to the above (C1), further including:

a base body placing device that places the base body at a predetermined position on the dyeing tray installed in the conveyance device, in which the base body movement device delivers the dye-deposited base body on which the dye is printed by the printing device from the printing position by the printing device to the base body placing device.

(C3) In the dye-deposited base body manufacturing apparatus according to the third aspect, the dye-deposited base body manufacturing apparatus according to the above (C1) or (C2), in which the printing device includes a carriage that moves a head ejecting the dye in a main scanning direction with respect to the base body, and the base body movement device also serves as a subscanning device that moves the base body in a subscanning direction intersecting the main scanning direction during printing of the dye by the printing device.

(C4) In the dye-deposited base body manufacturing apparatus according to the third aspect, the dye-deposited base body manufacturing apparatus according to any one of above (C1) to (C3), in which the printing device includes an operation unit to which an operation instruction is input by an operation of an operator and which faces a front side of the printing device, and the conveyance device is disposed on a side opposite to the front side of the printing device.

(C5) In the dye-deposited base body manufacturing apparatus according to the third aspect, the dye-deposited base body manufacturing apparatus according to any one of above (C1) to (C4), in which the base body movement device includes a base body support unit having a support surface on which the base body is placed; and a suction hole formed on the support surface of the base body support unit, and the base body is adsorbed on the support surface of the base body support unit by sucking gas from the suction hole.

(C6) In the dye-deposited base body manufacturing apparatus according to the third aspect, the dye-deposited base body manufacturing apparatus according to the above (C5), in which a plurality of the suction holes are provided at least along an outer peripheral portion of the support surface of the base body support unit.

(C7) In the dye-deposited base body manufacturing apparatus according to the third aspect, the dye-deposited base body manufacturing apparatus according to (C5) or (C6), in which the base body includes a metal layer.

(C8) According to the third aspect of the present disclosure, there is provided a dyeing system including:

the dye-deposited base body manufacturing apparatus according to any one of above (C1) to (C7);

a transfer device that transfers a dye of a dye-deposited base body, to which the dye is deposited, manufactured by the dye-deposited base body manufacturing apparatus to a resin body; and a dye fixing device that heats the resin body to which the dye is transferred by the transfer device to fix the dye deposited on a surface of the resin body to the resin body.

What is claimed is:

1. A dye-deposited base body manufacturing apparatus for the manufacture of a dye-deposited base body to which a dye to be transferred to a resin body is deposited for use in a dyeing step of dyeing the resin body, the dye-deposited base body manufacturing apparatus comprising:

a printing device that prints a dye on a printing surface of a base body having a sheet-shape;

a conveyance device that conveys a dyeing tray on which the resin body is placed;

a base body placing device that places the dye-deposited base body on which the dye is printed by the printing device at a predetermined position on the dyeing tray in the conveyance device; and a base body movement device that moves the dye-deposited base body from a printing position by the printing device to a side of the conveyance device by delivering the dye-deposited base body from the printing position to the base body placing device;

wherein the base body placing device has a base body holding unit that holds the base body in a state where the base body holding unit is in contact with a reverse surface of the base body that is opposite to the printing surface; and wherein a contact surface of the base body holding unit in contact with the reverse surface of the base body is a flat surface.

2. The dye-deposited base body manufacturing apparatus according to claim 1, wherein the printing device includes a carriage that moves a head ejecting the dye in a main scanning direction with respect to the base body, and the base body movement device also serves as a subscanning device that moves the base body in a subscanning direction intersecting the main scanning direction during printing of the dye by the printing device.

3. The dye-deposited base body manufacturing apparatus according to claim 1, wherein the printing device includes an operation unit to which an operation instruction is input by an operation of an operator and which faces a front side of the printing device, and the conveyance device is disposed on a side opposite to the front side of the printing device.

4. The dye-deposited base body manufacturing apparatus according to claim 1, wherein the base body movement device includes:

a base body support unit having a support surface on which the base body is placed; and a suction hole formed on the support surface of the base body support unit, and the base body is adsorbed on the support surface of the base body support unit by sucking gas from the suction hole.

5. The dye-deposited base body manufacturing apparatus according to claim 4,
   wherein a plurality of the suction holes are provided at least along an outer peripheral portion of the support surface of the base body support unit.

6. The dye-deposited base body manufacturing apparatus according to claim 4,
   wherein the base body includes a metal layer.

7. A dyeing system comprising:
   the dye-deposited base body manufacturing apparatus according to claim 1;
   a transfer device that transfers a dye of a dye-deposited base body, to which the dye is deposited, manufactured by the dye-deposited base body manufacturing apparatus to a resin body; and
   a dye fixing device that heats the resin body to which the dye is transferred by the transfer device to fix the dye deposited on a surface of the resin base body to the resin body.

* * * * *